(12) United States Patent
Cheng et al.

(10) Patent No.: US 10,270,576 B2
(45) Date of Patent: Apr. 23, 2019

(54) INFORMATION TRANSMISSION METHOD, USER EQUIPMENT, AND BASE STATION

(71) Applicant: Huawei Technologies Co., Ltd., Shenzhen, Guangdong (CN)

(72) Inventors: Yan Cheng, Beijing (CN); Lixia Xue, Beijing (CN); David jean-marie Mazzarese, Beijing (CN); Fredrik Berggren, Kista (SE); Brian Classon, Palatine, IL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 72 days.

(21) Appl. No.: 15/185,418

(22) Filed: Jun. 17, 2016

(65) Prior Publication Data

US 2016/0301502 A1    Oct. 13, 2016

Related U.S. Application Data

(63) Continuation of application No. PCT/CN2013/090044, filed on Dec. 20, 2013.

(51) Int. Cl.
*H04W 4/00*     (2018.01)
*H04L 5/00*     (2006.01)
(Continued)

(52) U.S. Cl.
CPC ............ *H04L 5/005* (2013.01); *H04L 1/0083* (2013.01); *H04L 1/1893* (2013.01); *H04L 5/0094* (2013.01); *H04W 72/042* (2013.01)

(58) Field of Classification Search
None
See application file for complete search history.

(56) References Cited

U.S. PATENT DOCUMENTS

2010/0260154 A1 * 10/2010 Frank ................... G01S 5/0205
                                                          370/336
2010/0309867 A1    12/2010 Palanki et al.
(Continued)

FOREIGN PATENT DOCUMENTS

CN    101682881 A    3/2010
CN    102740477 A    10/2012
(Continued)

OTHER PUBLICATIONS

"Analysis of CRS and PDSCH collisions in Scenarios 3 and 4", Intel Corporation, 3GPP TSG-RAN WG1 #66, Aug. 22-26, 2011, 6 pages, R1-112226.
(Continued)

*Primary Examiner* — Zewdu A Beyen

(57) ABSTRACT

The present invention discloses an information transmission method, user equipment, and a base station. The method includes: receiving indication information sent by a base station, where the indication information is used to indicate a first downlink subframe in which a cell-specific reference signal (CRS) is transmitted; determining the first downlink subframe according to the indication information; and performing information transmission according to the first downlink subframe. According to the information transmission method, the user equipment, and the base station of embodiments of the present invention, indication information is used to indicate a downlink subframe in which a cell-specific reference signal is transmitted.

16 Claims, 5 Drawing Sheets

(51) Int. Cl.
*H04L 1/00* (2006.01)
*H04L 1/18* (2006.01)
*H04W 72/04* (2009.01)

(56) References Cited

U.S. PATENT DOCUMENTS

| | | | |
|---|---|---|---|
| 2010/0309876 A1* | 12/2010 | Khandekar | H04L 5/0037 370/330 |
| 2011/0149813 A1 | 6/2011 | Parkvall et al. | |
| 2013/0010685 A1 | 1/2013 | Kim et al. | |
| 2013/0094389 A1 | 4/2013 | Parkvall et al. | |
| 2014/0029486 A1 | 1/2014 | Li et al. | |
| 2018/0070356 A1* | 3/2018 | He | H04W 76/10 |

FOREIGN PATENT DOCUMENTS

| | | |
|---|---|---|
| CN | 102870355 A | 1/2013 |
| WO | 2008/127185 A1 | 10/2008 |

OTHER PUBLICATIONS

"Other issues for TDD eIMTA", CATT, 3GPP TSG RAN WG1 Meeting #74, Aug. 19-23, 2013, 4 pages, R1-133016.

\* cited by examiner

INFORMATION TRANSMISSION METHOD, USER EQUIPMENT, AND BASE STATION

CROSS-REFERENCE TO RELATED APPLICATIONS

This application is a continuation of International Application No. PCT/CN2013/090044, filed on Dec. 20, 2013, which is hereby incorporated by reference in its entirety.

TECHNICAL FIELD

The present invention relates to the communications field, and in particular, to an information transmission method, user equipment, and a base station in the communications field.

BACKGROUND

In a current Long Term Evolution (LTE) system, user equipment (UE) synchronizes with an evolved NodeB (eNB) by detecting a primary synchronization signal (PSS) and a secondary synchronization signal (SSS) that are sent by an evolved NodeB (eNB), user equipment (UE) synchronizes with the eNB and recognizes a physical cell. Then, the UE reads a system broadcast message sent by the eNB, initiates random access to the eNB, and finally can establish a radio resource control (RRC) connection to the eNB, so that the UE can perform data communication with the eNB.

The UE in RRC_CONNECTED mode needs to perform necessary measurement and synchronization tracking to perform data communication with the eNB. For example, the UE needs to measure channel state information (CSI) by using a cell-specific reference signal (CRS) or a channel state information-reference signal (CSI-RS), so that the eNB selects a suitable modulation and coding scheme for data scheduling of the UE. For another example, the UE needs to perform synchronization tracking, that is, fine time and frequency synchronization, by using the CRS, to ensure demodulation performance of data. Still for another example, the UE further needs to perform radio resource management (RRM) measurement by using the CRS, to ensure mobility performance of the UE.

However, in the prior art, user equipment cannot know which downlink subframes are used by a base station to transmit a CRS, and therefore, performance of communication between the user equipment and the base station is severely affected.

SUMMARY

Embodiments of the present invention provide an information transmission method, user equipment, and a base station, so that the user equipment can know a downlink subframe in which a CRS is transmitted, and performance of a communications system can be improved.

According to a first aspect, an information transmission method is provided, where the method includes: receiving indication information sent by a base station, where the indication information is used to indicate a first downlink subframe in which a cell-specific reference signal CRS is transmitted; determining the first downlink subframe according to the indication information; and performing information transmission according to the first downlink subframe.

With reference to the first aspect, in a first possible implementation manner of the first aspect, the receiving indication information sent by a base station includes: receiving a downlink control channel that is sent by the base station and that is carried in a downlink subframe 0 and/or a downlink subframe 5, where the downlink control channel is used to indicate the first downlink subframe; and the determining the first downlink subframe according to the indication information includes: determining the first downlink subframe according to the downlink control channel.

With reference to the first possible implementation manner of the first aspect, in a second possible implementation manner of the first aspect, a cyclic redundancy check CRC code of the downlink control channel is scrambled by using a first radio network temporary identifier RNTI, where the first RNTI includes at least one of a random access RNTI, a paging RNTI, and a system information RNTI, and a first downlink control information DCI format used by the downlink control channel is a DCI format 1A; and the determining the first downlink subframe according to the downlink control channel includes: determining the first downlink subframe according to a hybrid automatic repeat request HARQ process number field in the DCI format 1A.

With reference to the first possible implementation manner of the first aspect, in a third possible implementation manner of the first aspect, a cyclic redundancy check CRC code of the downlink control channel is scrambled by using a second radio network temporary identifier RNTI, where the second RNTI is used to indicate that the downlink control channel carries information that indicates the first downlink subframe, a second downlink control information DCI format used by the downlink control channel includes a CRS indicator field, the CRS indicator field is used to indicate the first downlink subframe, and a size of the second DCI format is the same as a size of a DCI format 1A or a DCI format 1C; and the determining the first downlink subframe according to the downlink control channel includes: determining the first downlink subframe according to the CRS indicator field.

With reference to the first aspect, in a fourth possible implementation manner of the first aspect, the receiving indication information sent by a base station includes: receiving higher layer signaling sent by the base station, where the higher layer signaling indicates a second downlink subframe used to transmit common search space of a physical downlink control channel PDCCH, and the second downlink subframe is used to indicate the first downlink subframe; and the determining the first downlink subframe according to the indication information includes: determining the first downlink subframe according to the second downlink subframe.

With reference to the fourth possible implementation manner of the first aspect, in a fifth possible implementation manner of the first aspect, the determining the first downlink subframe according to the second downlink subframe includes: determining the second downlink subframe as the first downlink subframe in which the CRS is transmitted.

With reference to the first aspect, in a sixth possible implementation manner of the first aspect, the receiving indication information sent by a base station includes: receiving a master information block MIB sent by the base station, where the MIB is used to indicate the first downlink subframe; and the determining the first downlink subframe according to the indication information includes: determining the first downlink subframe according to the MIB.

With reference to the sixth possible implementation manner of the first aspect, in a seventh possible implementation manner of the first aspect, the MIB includes a CRS indicator field of 10 bits, and the CRS indicator field is used to indicate the first downlink subframe; and the determining the first downlink subframe according to the MIB includes: determining the first downlink subframe according to the CRS indicator field included in the MIB.

According to a second aspect, an information transmission method is provided, where the method includes: determining a first downlink subframe in which a cell-specific reference signal CRS is transmitted; sending, to user equipment, indication information used to indicate the first downlink subframe; and performing information transmission according to the first downlink subframe.

With reference to the second aspect, in a first possible implementation manner of the second aspect, the sending, to user equipment, indication information used to indicate the first downlink subframe includes: sending, to the user equipment, a downlink control channel that is carried in a downlink subframe 0 and/or a downlink subframe 5, where the downlink control channel is used to indicate the first downlink subframe.

With reference to the first possible implementation manner of the second aspect, in a second possible implementation manner of the second aspect, a cyclic redundancy check CRC code of the downlink control channel is scrambled by using a first radio network temporary identifier RNTI, where the first RNTI includes at least one of a random access RNTI, a paging RNTI, and a system information RNTI, a first downlink control information DCI format used by the downlink control channel is a DCI format 1A, and a hybrid automatic repeat request HARQ process number field in the DCI format 1A is used to indicate the first downlink subframe.

With reference to the first possible implementation manner of the second aspect, in a third possible implementation manner of the second aspect, a cyclic redundancy check CRC code of the downlink control channel is scrambled by using a second radio network temporary identifier RNTI, where the second RNTI is used to indicate that the downlink control channel carries information that indicates the first downlink subframe, a second downlink control information DCI format used by the downlink control channel includes a CRS indicator field, the CRS indicator field is used to indicate the first downlink subframe, and a size of the second DCI format is the same as a size of a DCI format 1A or a DCI format 1C.

With reference to the second aspect, in a fourth possible implementation manner of the second aspect, the sending, to user equipment, indication information used to indicate the first downlink subframe includes: sending higher layer signaling to the user equipment, where the higher layer signaling indicates a second downlink subframe used to transmit common search space of a physical downlink control channel PDCCH, and the second downlink subframe is used to indicate the first downlink subframe.

With reference to the fourth possible implementation manner of the second aspect, in a fifth possible implementation manner of the second aspect, the first downlink subframe in which the CRS is transmitted is the same as the second downlink subframe.

With reference to the second aspect, in a sixth possible implementation manner of the second aspect, the sending, to user equipment, indication information used to indicate the first downlink subframe includes: sending a master information block MIB to the user equipment, where the MIB is used to indicate the first downlink subframe.

With reference to the sixth possible implementation manner of the second aspect, in a seventh possible implementation manner of the second aspect, the MIB includes a CRS indicator field of 10 bits, and the CRS indicator field is used to indicate the first downlink subframe.

According to a third aspect, user equipment is provided, where the user equipment includes: a receiving module, configured to receive indication information sent by a base station, where the indication information is used to indicate a first downlink subframe in which a cell-specific reference signal CRS is transmitted; a determining module, configured to determine the first downlink subframe according to the indication information received by the receiving module; and a transmission module, configured to perform information transmission according to the first downlink subframe determined by the determining module.

With reference to the third aspect, in a first possible implementation manner of the third aspect, the receiving module includes: a first receiving unit, configured to receive a downlink control channel that is sent by the base station and that is carried in a downlink subframe 0 and/or a downlink subframe 5, where the downlink control channel is used to indicate the first downlink subframe; and the determining module includes: a first determining unit, configured to determine the first downlink subframe according to the downlink control channel received by the first receiving unit.

With reference to the first possible implementation manner of the third aspect, in a second possible implementation manner of the third aspect, a cyclic redundancy check CRC code of the downlink control channel received by the first receiving unit is scrambled by using a first radio network temporary identifier RNTI, where the first RNTI includes at least one of a random access RNTI, a paging RNTI, and a system information RNTI, and a first downlink control information DCI format used by the downlink control channel is a DCI format 1A; and the first determining unit is specifically configured to determine the first downlink subframe according to a hybrid automatic repeat request HARQ process number field in the DCI format 1A.

With reference to the first possible implementation manner of the third aspect, in a third possible implementation manner of the third aspect, a cyclic redundancy check CRC code of the downlink control channel received by the first receiving unit is scrambled by using a second radio network temporary identifier RNTI, where the second RNTI is used to indicate that the downlink control channel carries information that indicates the first downlink subframe, a second downlink control information DCI format used by the downlink control channel includes a CRS indicator field, the CRS indicator field is used to indicate the first downlink subframe, and a size of the second DCI format is the same as a size of a DCI format 1A or a DCI format 1C; and the first determining unit is specifically configured to determine the first downlink subframe according to the CRS indicator field.

With reference to the third aspect, in a fourth possible implementation manner of the third aspect, the receiving module includes: a second receiving unit, configured to receive higher layer signaling sent by the base station, where the higher layer signaling indicates a second downlink subframe used to transmit common search space of a physical downlink control channel PDCCH, and the second downlink subframe is used to indicate the first downlink subframe; and the determining module includes: a second determining unit, configured to determine the first downlink subframe according to the second downlink subframe indicated by the higher layer signaling received by the second receiving unit.

With reference to the fourth possible implementation manner of the third aspect, in a fifth possible implementation manner of the third aspect, the second determining unit is specifically configured to determine, as the first downlink subframe in which the CRS is transmitted, the second downlink subframe indicated by the higher layer signaling received by the second receiving unit.

With reference to the third aspect, in a sixth possible implementation manner of the third aspect, the receiving module includes: a third receiving unit, configured to receive a master information block MIB sent by the base station, where the MIB is used to indicate the first downlink subframe; and the determining module includes: a third determining unit, configured to determine the first downlink subframe according to the MIB received by the third receiving unit.

With reference to the sixth possible implementation manner of the third aspect, in a seventh possible implementation manner of the third aspect, the MIB received by the third receiving unit includes a CRS indicator field of 10 bits, and the CRS indicator field is used to indicate the first downlink subframe; and the third determining unit is specifically configured to determine the first downlink subframe according to the CRS indicator field included in the MIB received by the third receiving unit.

According to a fourth aspect, a base station is provided, where the base station includes: a determining module, configured to determine a first downlink subframe in which a cell-specific reference signal CRS is transmitted; a sending module, configured to send, to user equipment, indication information used to indicate the first downlink subframe determined by the determining module; and a transmission module, configured to perform information transmission according to the first downlink subframe determined by the determining module.

With reference to the fourth aspect, in a first possible implementation manner of the fourth aspect, the sending module includes: a first sending unit, configured to send, to the user equipment, a downlink control channel that is carried in a downlink subframe 0 and/or a downlink subframe 5, where the downlink control channel is used to indicate the first downlink subframe.

With reference to the first possible implementation manner of the fourth aspect, in a second possible implementation manner of the fourth aspect, a cyclic redundancy check CRC code of the downlink control channel sent by the first sending unit is scrambled by using a first radio network temporary identifier RNTI, where the first RNTI includes at least one of a random access RNTI, a paging RNTI, and a system information RNTI, a first downlink control information DCI format used by the downlink control channel is a DCI format 1A, and a hybrid automatic repeat request HARQ process number field in the DCI format 1A is used to indicate the first downlink subframe.

With reference to the first possible implementation manner of the fourth aspect, in a third possible implementation manner of the fourth aspect, a cyclic redundancy check CRC code of the downlink control channel sent by the first sending unit is scrambled by using a second radio network temporary identifier RNTI, where the second RNTI is used to indicate that the downlink control channel carries information that indicates the first downlink subframe, a second downlink control information DCI format used by the downlink control channel includes a CRS indicator field, the CRS indicator field is used to indicate the first downlink subframe, and a size of the second DCI format is the same as a size of a DCI format 1A or a DCI format 1C.

With reference to the fourth aspect, in a fourth possible implementation manner of the fourth aspect, the sending module includes: a second sending unit, configured to send higher layer signaling to the user equipment, where the higher layer signaling indicates a second downlink subframe used to transmit common search space of a physical downlink control channel PDCCH, and the second downlink subframe is used to indicate the first downlink subframe.

With reference to the fourth possible implementation manner of the fourth aspect, in a fifth possible implementation manner of the fourth aspect, the second downlink subframe indicated by the higher layer signaling sent by the second sending unit is the same as the first downlink subframe in which the CRS is transmitted.

With reference to the fourth aspect, in a sixth possible implementation manner of the fourth aspect, the sending module includes: a third sending unit, configured to send a master information block MIB to the user equipment, where the MIB is used to indicate the first downlink subframe.

With reference to the sixth possible implementation manner of the fourth aspect, in a seventh possible implementation manner of the fourth aspect, the MIB sent by the third sending unit includes a CRS indicator field of 10 bits, and the CRS indicator field is used to indicate the first downlink subframe.

According to a fifth aspect, user equipment is provided, and the user equipment includes a processor, a memory, a bus system, and a transceiver, where the processor, the memory and the transceiver are connected by using the bus system, the memory is configured to store an instruction, and the processor is configured to execute the instruction stored by the memory, to control the transceiver to receive a signal or send a signal; and the transceiver is configured to receive indication information sent by a base station, where the indication information is used to indicate a first downlink subframe in which a cell-specific reference signal CRS is transmitted; the processor is configured to determine the first downlink subframe according to the indication information; and the transceiver is further configured to perform information transmission according to the first downlink subframe.

With reference to the fifth aspect, in a first possible implementation manner of the fifth aspect, the receiving, by the transceiver, indication information sent by a base station includes: receiving a downlink control channel that is sent by the base station and that is carried in a downlink subframe 0 and/or a downlink subframe 5, where the downlink control channel is used to indicate the first downlink subframe; and the determining, by the processor, the first downlink subframe according to the indication information includes: determining the first downlink subframe according to the downlink control channel.

With reference to the first possible implementation manner of the fifth aspect, in a second possible implementation manner of the fifth aspect, a cyclic redundancy check CRC code of the downlink control channel is scrambled by using a first radio network temporary identifier RNTI, where the first RNTI includes at least one of a random access RNTI, a paging RNTI, and a system information RNTI, and a first downlink control information DCI format used by the downlink control channel is a DCI format 1A; and the determining, by the processor, the first downlink subframe according to the downlink control channel includes: determining the first downlink subframe according to a hybrid automatic repeat request HARQ process number field in the DCI format 1A.

With reference to the first possible implementation manner of the fifth aspect, in a third possible implementation manner of the fifth aspect, a cyclic redundancy check CRC code of the downlink control channel is scrambled by using a second radio network temporary identifier RNTI, where the second RNTI is used to indicate that the downlink control channel carries information that indicates the first downlink subframe, a second downlink control information DCI format used by the downlink control channel includes a CRS indicator field, the CRS indicator field is used to indicate the first downlink subframe, and a size of the second DCI format is the same as a size of a DCI format 1A, or a DCI format 1C; and the determining, by the processor, the first downlink subframe according to the downlink control channel includes: determining the first downlink subframe according to the CRS indicator field.

With reference to the fifth aspect, in a fourth possible implementation manner of the fifth aspect, the receiving, by the transceiver, indication information sent by a base station includes: receiving higher layer signaling sent by the base station, where the higher layer signaling indicates a second downlink subframe used to transmit common search space of a physical downlink control channel PDCCH, and the second downlink subframe is used to indicate the first downlink subframe; and the determining, by the processor, the first downlink subframe according to the indication information includes: determining the first downlink subframe according to the second downlink subframe.

With reference to the fourth possible implementation manner of the fifth aspect, in a fifth possible implementation manner of the fifth aspect, the determining, by the processor, the first downlink subframe according to the second downlink subframe includes: determining the second downlink subframe as the first downlink subframe in which the CRS is transmitted.

With reference to the fifth aspect, in a sixth possible implementation manner of the fifth aspect, the receiving, by the transceiver, indication information sent by a base station includes: receiving a master information block MIB sent by the base station, where the MIB is used to indicate the first downlink subframe; and the determining, by the processor, the first downlink subframe according to the indication information includes: determining the first downlink subframe according to the MIB.

With reference to the sixth possible implementation manner of the fifth aspect, in a seventh possible implementation manner of the fifth aspect, the MIB includes a CRS indicator field of 10 bits, and the CRS indicator field is used to indicate the first downlink subframe; and the determining, by the processor, the first downlink subframe according to the MIB includes: determining the first downlink subframe according to the CRS indicator field included in the MIB.

According to a sixth aspect, a base station is provided, and the base station includes a processor, a memory, a bus system, and a transceiver, where the processor, the memory and the transceiver are connected by using the bus system, the memory is configured to store an instruction, and the processor is configured to execute the instruction stored by the memory, to control the transceiver to receive a signal or send a signal; and the processor is configured to determine a first downlink subframe in which a cell-specific reference signal CRS is transmitted; the transceiver is configured to send, to user equipment, indication information used to indicate the first downlink subframe; and the transceiver is further configured to perform information transmission according to the first downlink subframe.

With reference to the sixth aspect, in a first possible implementation manner of the sixth aspect, the sending, by the transceiver, to user equipment, indication information used to indicate the first downlink subframe includes: sending, to the user equipment, a downlink control channel that is carried in a downlink subframe 0 and/or a downlink subframe 5, where the downlink control channel is used to indicate the first downlink subframe.

With reference to the first possible implementation manner of the sixth aspect, in a second possible implementation manner of the sixth aspect, a cyclic redundancy check CRC code of the downlink control channel sent by the transceiver is scrambled by using a first radio network temporary identifier RNTI, where the first RNTI includes at least one of a random access RNTI, a paging RNTI, and a system information RNTI, a first downlink control information DCI format used by the downlink control channel is a DCI format 1A, and a hybrid automatic repeat request HARQ process number field in the DCI format 1A is used to indicate the first downlink subframe.

With reference to the first possible implementation manner of the sixth aspect, in a third possible implementation manner of the sixth aspect, a cyclic redundancy check CRC code of the downlink control channel sent by the transceiver is scrambled by using a second radio network temporary identifier RNTI, where the second RNTI is used to indicate that the downlink control channel carries information that indicates the first downlink subframe, a second downlink control information DCI format used by the downlink control channel includes a CRS indicator field, the CRS indicator field is used to indicate the first downlink subframe, and a size of the second DCI format is the same as a size of a DCI format 1A or a DCI format 1C.

With reference to the sixth aspect, in a fourth possible implementation manner of the sixth aspect, the sending, by the transceiver, to user equipment, indication information used to indicate the first downlink subframe includes: sending higher layer signaling to the user equipment, where the higher layer signaling indicates a second downlink subframe used to transmit common search space of a physical downlink control channel PDCCH, and the second downlink subframe is used to indicate the first downlink subframe.

With reference to the fourth possible implementation manner of the sixth aspect, in a fifth possible implementation manner of the sixth aspect, the first downlink subframe in which the CRS is transmitted is the same as the second downlink subframe.

With reference to the sixth aspect, in a sixth possible implementation manner of the sixth aspect, the sending, by the transceiver, to user equipment, indication information used to indicate the first downlink subframe includes: sending a master information block MIB to the user equipment, where the MIB is used to indicate the first downlink subframe.

With reference to the sixth possible implementation manner of the sixth aspect, in a seventh possible implementation manner of the sixth aspect, the MIB includes a CRS indicator field of 10 bits, and the CRS indicator field is used to indicate the first downlink subframe.

Based on the foregoing technical solutions and according to the information transmission method, the user equipment, and the base station of the embodiments of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with a base station according to the downlink subframe in which the CRS is transmitted. In this way, performance of a communications system can be improved.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that the technical solutions of the embodiments of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LTE frequency division duplex (FDD) system, LTE time division duplex (TDD), a Universal Mobile Telecommunications System (UMTS), or a Worldwide Interoperability for Microwave Access (WiMAX) communications system.

It should also be understood that in the embodiments of the present invention, user equipment (UE) may be referred to as a terminal (Terminal), a mobile station (MS), a mobile terminal (Mobile Terminal), and the like. The user equipment may communicate with one or more core networks by using a radio access network (RAN). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present invention, a base station may be a base station (BTS) in the GSM or CDMA, or may be a base station (NodeB, "NB" for short) in the WCDMA, or may be an evolved NodeB (Evolutional Node B, "eNB" or "e-NodeB" for short) in the LTE, which is not limited in the present invention. However, for ease of description, the following embodiments are described by using an eNB as an example.

Figure 1:
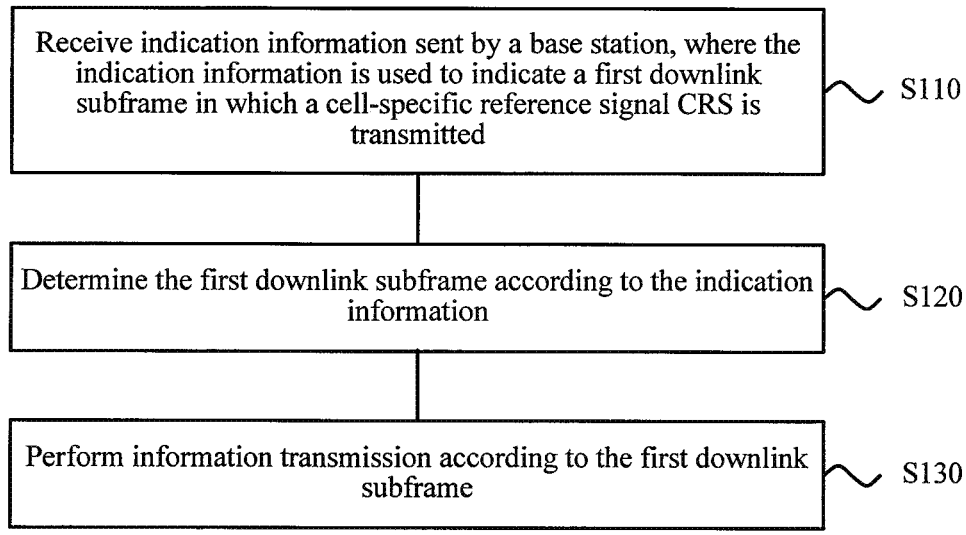
FIG. 1 is a schematic flowchart of an information transmission method according to an embodiment of the present invention.

FIG. 1 is a schematic flowchart of an information transmission method 100 according to an embodiment of the present invention. The method 100 may be executed by a device on a user equipment side, for example, may be executed by UE. As shown in FIG. 1, the method 100 includes:

S110: Receive indication information sent by a base station, where the indication information is used to indicate a first downlink subframe in which a cell-specific reference signal CRS is transmitted, S120: Determine the first downlink subframe according to the indication information.

S130: Perform information transmission according to the first downlink subframe.

Specifically, user equipment determines the first downlink subframe in which the cell-specific reference signal CRS is transmitted, or user equipment determines, according to the indication information, the first downlink subframe in which the cell-specific reference signal CRS is transmitted, and therefore may perform information transmission according to the first downlink subframe. For example, after determining the first downlink subframe in which the CRS is transmitted, the base station may send, to the user equipment, the indication information used to indicate the first downlink subframe; the user equipment may receive the indication information sent by the base station, so that the user equipment may determine, according to the indication information, the first downlink subframe in which the CRS is transmitted, and may perform information transmission according to the first downlink subframe, for example, transmitting a CRS, or detecting a channel to transmit a channel signal, or transmitting data.

Therefore, in the information transmission method of this embodiment of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with a base station according to the downlink subframe in which the CRS is transmitted. In this way, performance of a communications system can be improved.

In an LTE system, UE in an RRC_CONNECTED mode needs to perform necessary measurement and synchronization tracking to perform data communication with an eNB. To meet requirements of the foregoing measurement and synchronization, time-frequency granularity of a signal in the LTE system may be: A sending period of a PSS and an SSS is both 5 ms, and two orthogonal frequency division multiplexing (Orthogonal Frequency Division Multiplexing, "OFDM" for short) symbols of six resource blocks at the center of a carrier are occupied for each transmission; each subframe that carries a CRS requires fullband transmission, which generally occupies two or four resource units in two OFDM symbols of one resource block; especially, for a later evolved LTE system, a non-backward compatible carrier is introduced, and a sending period of the CRS at least needs to be kept as 5 ms; as a reference signal for CSI measurement, such as a CSI-RS, a current shortest sending period is 5 ms, and an occupied resource is more sparse than that of the CRS.

It can be seen that, sending periods of some reference signals, such as the PSS, the SSS, and the CRS in the LTE system are relatively short; even if there is no UE requiring a service, the eNB still needs to send the foregoing reference signals, and therefore, power efficiency of the eNB is not very high. On the other hand, even if there is no UE requiring a service, because the eNB needs to send the CRS in each subframe, the sent CRS still causes interference to data communication of another cell, affecting system performance of the another cell.

To improve the power efficiency of the eNB and reduce interference between cells, a dynamic base-station discontinuous transmission (DTX) technology may be introduced in a later evolved system. In the technology, a signal may not be sent in any downlink subframe in a cell, but the following restrictions need to be satisfied:

(1) if a transmission mode (transmission modes 1 to 10) is configured for one or more UEs in UEs served by the cell, then a PSS/SSS/CRS is sent according to a rule in LTE version 8 to LTE version 11, that is, the PSS/SSS is sent in a period of 5 ms, and the CRS is sent in each subframe; and (2) if a transmission mode x is configured for one or more UEs in UEs served by the cell, and the transmission mode x is an enhanced transmission mode and is a transmission mode other than transmission modes 1 to 10, only a downlink subframe 0 and a downlink subframe 5 certainly transmit the CRS, and whether the CRS is transmitted in other downlink subframes is not limited.

In the foregoing DTX technology, for user equipment UE for which the transmission mode x is configured, the UE can clearly know only that the downlink subframe 0 and the downlink subframe 5 transmit the CRS, but cannot know whether the CRS is transmitted in other downlink subframes. However, whether the CRS is transmitted in a downlink subframe has great impact on information transmission between user equipment and a base station, for example, has impact on channel detection, channel information measurement, and the like performed by the user equipment, for example, has impact on detection of a physical downlink shared channel (PDSCH), detection of a physical downlink control channel (PDCCH), detection of an enhanced physical downlink control channel (EPDCCH), detection of a physical hybrid automatic repeat request indicator channel (PHICH, where a hybrid automatic repeat request (Hybrid Automatic Repeat Request) is referred to "HARQ" for short), and the like. For another example, if the CRS is transmitted in a downlink subframe, but when decoding a PDSCH, the user equipment considers that no CRS is transmitted, and performs detection by considering the CRS signal as a PDSCH signal, which therefore causes that the user equipment cannot correctly receive the PDSCH, thereby greatly affecting performance of data communication between the user equipment and the base station.

In this embodiment of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with a base station according to the downlink subframe in which the CRS is transmitted. In this way, performance of a communications system can be improved. For example, the user equipment can correctly perform channel detection and channel information measurement according to the downlink subframe in which the CRS is transmitted; for another example, the user equipment can correctly detect a channel such as a PDSCH, a PDCCH, an EPDCCH, and a PHICH according to the downlink subframe in which the CRS is transmitted, so that the user equipment can correctly receive data of the base station, can also correctly send data to the base station, and therefore can correctly communicate with the base station. In this way, performance of a communications system can be improved.

The information transmission method according to this embodiment of the present invention is described in detail below with reference to FIG. 2 to FIG. 4.

Figure 2:
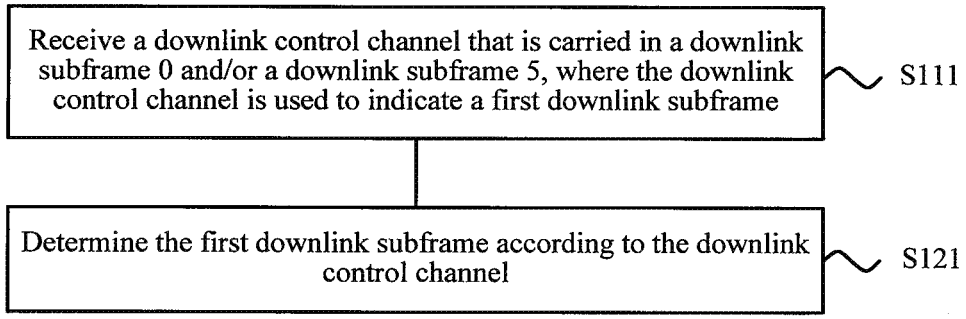
FIG. 2 is a schematic flowchart of a method for determining a downlink subframe according to an embodiment of the present invention.

As shown in FIG. 2, in this embodiment of the present invention, optionally, the receiving indication information sent by a base station includes:

S111: Receive a downlink control channel that is sent by the base station and that is carried in a downlink subframe 0 and/or a downlink subframe 5, where the downlink control channel is used to indicate the first downlink subframe.

The determining the first downlink subframe according to the indication information includes:

S121: Determine the first downlink subframe according to the downlink control channel.

Specifically, in S111, user equipment receives the downlink control channel sent by the base station, the downlink control channel is carried in the downlink subframe 0 and/or the downlink subframe 5, and the downlink control channel is used to indicate the first downlink subframe. That is, the downlink control channel may include the indication information used to indicate the first downlink subframe, or the downlink control channel itself is the indication information that is used by the base station to indicate the first downlink subframe to the user equipment, but this embodiment of the present invention is not limited thereto.

It should be understood that, in this embodiment of the present invention, the downlink control channel is a type of resource that is used to transmit information of a control plane. A downlink subframe may carry resource indication information used to indicate a resource, that is, the receiving a downlink control channel that is sent by the base station and that is carried in a downlink subframe 0 and/or a downlink subframe 5 may be understood as: receiving resource indication information that is sent by the base station and that is used to indicate the downlink control channel, where the resource indication information is carried in the downlink subframe 0 and/or the downlink subframe 5.

In S121, the user equipment may determine, according to the downlink control channel, the first downlink subframe in which the CRS is transmitted.

That is, in this embodiment of the present invention, the user equipment receives the downlink control channel carried in the downlink subframe 0 and/or the downlink subframe 5, and may determine, according to the downlink control channel, the first downlink subframe in which the cell-specific reference signal CRS is transmitted, so that the user equipment may perform information transmission according to the first downlink subframe.

That is, in this embodiment of the present invention, the indication information used to indicate the first downlink subframe in which the CRS is transmitted is a downlink control channel, and the user equipment may determine, according to the downlink control channel, the first downlink subframe in which the CRS is transmitted.

It should be understood that, in this embodiment of the present invention, the first downlink subframe represents one or more downlink subframes in which the cell-specific reference signal CRS is transmitted. It should further be understood that, in this embodiment of the present invention, the first downlink subframe determined by the user equipment according to the indication information may include the downlink subframe 0 and the downlink subframe 5 in which the CRS is transmitted, or may not include the downlink subframe 0 and the downlink subframe 5. In addition, the first downlink subframe may further include a downlink subframe in a radio subframe except the downlink subframe 0 and the downlink subframe 5, where the CRS is transmitted in the downlink subframe. This embodiment of the present invention is not limited thereto.

It should further be understood that, this embodiment of the present invention only uses the DTX technology as an example for description, but the present invention is not limited thereto. The information transmission method based on this embodiment of the present invention may also be applied to another technology, so that the user equipment can know the downlink subframe in which the CRS is transmitted, can also know whether the CRS is transmitted in each downlink subframe, and can correctly communicate with the base station according to the downlink subframe in which the CRS is transmitted. In this way, performance of a communications system can be improved.

In this embodiment of the present invention, a downlink control information (DCI) format used by the downlink control channel may be used to indicate the first downlink subframe. For example, a hybrid automatic repeat request (HARQ) field in the DCI format may be used to indicate the first downlink subframe, and another field in the DCI format may also be used to indicate the first downlink subframe. For example, the DCI format may include a CRS indicator field used to indicate the first downlink subframe.

Optionally, in this embodiment of the present invention, a cyclic redundancy check (CRC) code of the downlink control channel is scrambled by using a first radio network temporary identifier (RNTI), where the first RNTI includes at least one of a random access RNTI (RA-RNTI), a paging RNTI (Paging RNTI, "P-RNTI" for short), and a system information RNTI (System Information RNTI, "SI-RNTI" for short), and a first downlink control information DCI format used by the downlink control channel is a DCI format 1A; and the determining the first downlink subframe according to the downlink control channel includes:

determining the first downlink subframe according to a hybrid automatic repeat request HARQ process number field in the DCI format 1A.

Specifically, in this embodiment of the present invention, the downlink control channel may be a PDCCH, or may be an EPDCCH; the first DCI format used by the downlink control channel may be the DCI format 1A, and the HARQ process number field in the DCI format 1A may be used to indicate the first downlink subframe in which the CRS is transmitted. Therefore, the user equipment may determine, according to the HARQ process number field included in the DCI format 1A used by the received downlink control channel, the first downlink subframe in which the CRS is transmitted. Specifically, the user equipment may determine, according to the HARQ process number field included in the DCI format 1A used by the received downlink control channel and a preset correspondence between a value of the HARQ process number field and a downlink subframe in which the CRS is transmitted, the first downlink subframe in which the CRS is transmitted.

For example, the preset correspondence between a value of the HARQ process number field and a downlink subframe in which the CRS is transmitted may be shown in Table 1, and the user equipment may determine, according to a value '100' of the HARQ process number field, that the first downlink subframe in which the CRS is transmitted is a downlink subframe 1 and a downlink subframe 6. For another example, the user equipment may determine, according to a value '110' of the HARQ process number field, that the first downlink subframe in which the CRS is transmitted is a downlink subframe 1, a downlink subframe 2, a downlink subframe 6, and a downlink subframe 7. For still another example, the user equipment may determine, according to a value '111' of the HARQ process number field, that the first downlink subframe in which the CRS is transmitted is all downlink subframes.

TABLE 1

| Value of the HARQ process number field | Downlink subframe in which the CRS is transmitted |
|---|---|
| '100' | Downlink subframe 1 and downlink subframe 6 |
| '110' | Downlink subframe 1, downlink subframe 2, downlink subframe 6, and downlink subframe 7 |
| '111' | All downlink subframes |

It should be understood that, this embodiment of the present invention is described by using the correspondence shown in Table 1 as an example only, but the present invention is not limited thereto. For example, a value '100' of the HARQ process number field may also be used to indicate that the downlink subframe in which the CRS is transmitted is a downlink subframe 1.

In this embodiment of the present invention, after determining the first downlink subframe in which the CRS is transmitted, the user equipment may perform information transmission according to the determined first downlink subframe, for example, transmitting a CRS, or detecting a channel to transmit a channel signal, or transmitting data.

For example, in the downlink subframe in which the CRS is transmitted, the user equipment performs information transmission based on the assumption that a CRS has been transmitted. For example, the user equipment may detect, in the downlink subframe in which the CRS is transmitted, PDCCH common search space (CSS). For another example, the user equipment detects a PHICH only in the downlink subframe in which the CRS is transmitted. For still another example, in the downlink subframe in which the CRS is transmitted, the user equipment performs EPDCCH detection or performs PDCCH detection or the like based on the assumption that a CRS has been transmitted.

For example, for a downlink subframe in which no CRS is transmitted, the user equipment performs information transmission based on the assumption that no CRS has been transmitted. For example, for a downlink subframe in which no CRS is transmitted, the user equipment does not need to detect PDCCH CSS. For another example, for a downlink subframe in which no CRS is transmitted, the user equipment does not need to detect a PHICH. For still another example, for a downlink subframe in which no CRS is transmitted, the user equipment performs EPDCCH detection or performs PDCCH detection or the like based on the assumption that no CRS has been transmitted.

That is, in this embodiment of the present invention, the user equipment receives the downlink control channel whose CRC code is scrambled by using the first RNTI, the downlink control channel is carried in the downlink subframe 0 and/or the downlink subframe 5, the downlink control channel is a PDCCH or an EPDCCH, the first RNTI includes at least one of a random access RNTI, a paging RNTI, and a system information RNTI, and the first downlink control information DCI format used by the downlink control channel is the DCI format 1A. The user equipment determines the first downlink subframe according to the hybrid automatic repeat request HARQ process number field in the DCI format 1A, so that the user equipment may perform information transmission according to the first downlink subframe.

Therefore, in the information transmission method of this embodiment of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with a base station according to the downlink subframe in which the CRS is transmitted. In this way, performance of a communications system can be improved.

In addition, in the information transmission method of this embodiment of the present invention, a reserved bit in the DCI format 1A for indicating public message sending is reused to indicate the first downlink subframe in which the CRS is transmitted. On the one hand, a problem of how to indicate, to UE, a first downlink subframe in which a CRS is transmitted is resolved; on the other hand, because no new indication signaling needs to be introduced in the method, standard complexity can be reduced and system resources can be saved.

In this embodiment of the present invention, optionally, a cyclic redundancy check CRC code of the downlink control channel is scrambled by using a second radio network temporary identifier RNTI, where the second RNTI is used to indicate that the downlink control channel carries information that indicates the first downlink subframe, a second downlink control information DCI format used by the downlink control channel includes a CRS indicator field, the CRS indicator field is used to indicate the first downlink subframe, and a size of the second DCI format is the same as a size of a DCI format 1A or a DCI format 1C; and the determining the first downlink subframe according to the downlink control channel includes:

determining the first downlink subframe according to the CRS indicator field.

Specifically, in this embodiment of the present invention, the downlink control channel may be a PDCCH, or may be an EPDCCH, and the second RNTI for scrambling the CRC code is used to indicate that the downlink control channel carries the information that indicates the first downlink subframe; in addition, the second DCI format used by the downlink control channel includes the CRS indicator field used to indicate the first downlink subframe, and the size of the second DCI format may be the same as the size of the DCI format 1A or the DCI format 1C, so as to reduce standard complexity. Therefore, the user equipment may determine, according to the CRS indicator field included in the second DCI format used by the received downlink control channel, the first downlink subframe in which the CRS is transmitted. Specifically, the user equipment may determine, according to the CRS indicator field and a correspondence between a value of the CRS indicator field and a downlink subframe in which the CRS is transmitted, the first downlink subframe in which the CRS is transmitted.

For example, as shown in Table 2, the user equipment may determine, according to a value '0000' of the CRS indicator field, a downlink subframe in which no CRS is transmitted; for another example, the user equipment may determine, according to a value '0001' of the CRS indicator field, that the first downlink subframe in which the CRS is transmitted is a downlink subframe 1 or a downlink subframe 6; for still another example, the user equipment may determine, according to a value '0011' of the CRS indicator field, that the first downlink subframe in which the CRS is transmitted is a downlink subframe 1 and a downlink subframe 2, or may determine that the first downlink subframe in which the CRS is transmitted is a downlink subframe 6 and a downlink subframe 7, or the like.

TABLE 2

| Value of the HARQ process number field | Downlink subframe in which the CRS is transmitted |
| --- | --- |
| '0000' | A downlink subframe in which no CRS is transmitted |
| '0001' | Downlink subframe 1 or downlink subframe 6 |
| '0011' | Downlink subframe 1 and downlink subframe 2; or downlink subframe 6 and downlink subframe 7 |
| '0111' | Downlink subframe 1, downlink subframe 2, and downlink subframe 3; or downlink subframe 6, downlink subframe 7 and downlink subframe 8 |
| '1111' | All downlink subframes |

It should be understood that, this embodiment of the present invention is described by using the correspondence shown in Table 2 as an example only, but the present invention is not limited thereto. For example, a value '0001' of the HARQ process number field may also be used to indicate that the downlink subframe in which the CRS is transmitted is a downlink subframe 2 or a downlink subframe 7.

In this embodiment of the present invention, after determining the first downlink subframe in which the CRS is transmitted, the user equipment may perform information transmission according to the determined first downlink subframe, for example, transmitting a CRS, or detecting a channel to transmit a channel signal, or transmitting data.

That is, in this embodiment of the present invention, the user equipment receives the downlink control channel whose CRC code is scrambled by using the second RNTI, the downlink control channel is carried in a downlink subframe 0 and/or a downlink subframe 5, the downlink control channel is a PDCCH or an EPDCCH, the second RNTI is used to indicate that the downlink control channel carries the information that indicates the first downlink subframe, the second downlink control information DCI format used by the downlink control channel includes the CRS indicator field, the CRS indicator field is used to indicate the first downlink subframe, and the size of the second DCI format is the same as the size of the DCI format 1A or the DCI format 1C; the user equipment determines the first downlink subframe according to the CRS indicator field, so that the user equipment may perform information transmission according to the first downlink subframe.

Therefore, in the information transmission method of this embodiment of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with a base station according to the downlink subframe in which the CRS is transmitted. In this way, performance of a communications system can be improved.

In addition, in the information transmission method of this embodiment of the present invention, an existing channel, existing signaling, an existing message, or the like is reused to indicate, to the user equipment, the first downlink subframe in which the CRS is transmitted, which can also simplify an operation procedure and save system resources.

It should be understood that, in this embodiment of the present invention, the downlink control channel used to indicate the first downlink subframe may be carried in the downlink subframe 0 and/or the downlink subframe 5, so as to reduce standard complexity, but the present invention is not limited thereto; the downlink control channel used to indicate the first downlink subframe may also be carried in another downlink subframe except the downlink subframe 0 and the downlink subframe 5.

It should be further understood that, in this embodiment of the present invention, that the DCI format used by the downlink control channel indicates the first downlink subframe is merely used as an example for description, but the present invention is not limited thereto, for example, other information related to the downlink control channel may also be used for the first downlink subframe, or the downlink control channel may include indication information used to indicate the first downlink subframe.

Figure 3:
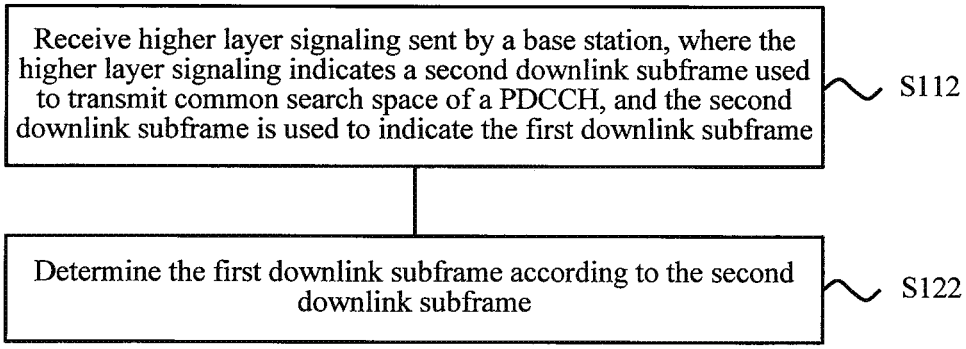
FIG. 3 is another schematic flowchart of a method for determining a downlink subframe according to an embodiment of the present invention.

In this embodiment of the present invention, optionally, as shown in FIG. 3, the receiving indication information sent by a base station includes:

S112: Receive higher layer signaling sent by the base station, where the higher layer signaling indicates a second downlink subframe used to transmit common search space of a physical downlink control channel PDCCH, and the second downlink subframe is used to indicate the first downlink subframe.

The determining the first downlink subframe according to the indication information includes:

S122: Determine the first downlink subframe according to the second downlink subframe.

Specifically, the user equipment may learn, according to the received higher layer signaling, the second downlink subframe in which the common search space of the PDCCH is transmitted, and therefore determines the first downlink subframe according to an association relationship between the second downlink subframe and the first downlink subframe in which the CRS is transmitted.

In this embodiment of the present invention, the user equipment may determine a part of downlink subframes in the second downlink subframe as the first downlink subframe. For example, the user equipment may determine a downlink subframe having a smallest sequence number in the second downlink subframe as the first downlink subframe in which the CRS is transmitted; or the user equipment may determine a downlink subframe having a largest sequence number in the second downlink subframe as the first downlink subframe in which the CRS is transmitted; or the like.

In this embodiment of the present invention, the user equipment may determine all of downlink subframes in the second downlink subframe as the first downlink subframe. That is, optionally, the determining the first downlink subframe according to the second downlink subframe includes: determining the second downlink subframe as the first downlink subframe in which the CRS is transmitted.

That is, in this embodiment of the present invention, the user equipment receives higher layer signaling, where the higher layer signaling indicates a second downlink subframe in which common search space of a physical downlink control channel PDCCH is transmitted; and may determine, according to the second downlink subframe, the first downlink subframe in which the cell-specific reference signal CRS is transmitted. Optionally, the user equipment determines the second downlink subframe as the first downlink subframe in which the cell-specific reference signal CRS is transmitted.

That is, in this embodiment of the present invention, the indication information used to indicate the first downlink subframe in which the CRS is transmitted is higher layer signaling, more specifically, the indication information is a second downlink subframe indicated by the higher layer signaling, and therefore the user equipment may determine, according to the second downlink subframe, the first downlink subframe in which the CRS is transmitted.

Optionally, when the user equipment determines, according to the second downlink subframe in which the common search space of the PDCCH is transmitted, the first downlink subframe in which the CRS is transmitted, step S110 may also be receiving indication information sent by a base station; step S120 may also be determining, according to the indication information, the first downlink subframe in which the CRS is transmitted; step S130 may still be performing information transmission according to the first downlink subframe. In this case, step S112 may be: receiving higher layer signaling sent by the base station, where the higher layer signaling indicates a second downlink subframe in which common search space of a physical downlink control channel PDCCH is transmitted; step S122 may be determining, according to the second downlink subframe, the first downlink subframe in which the CRS is transmitted, and may be specifically that the user equipment determines the second downlink subframe as the first downlink subframe in which the cell-specific reference signal CRS is transmitted.

It should further be understood that, in this embodiment of the present invention, the user equipment may determine, according to an association relationship or a correspondence between the second downlink subframe and the first downlink subframe in which the CRS is transmitted, a downlink subframe that does not belong to the second downlink subframe as the first downlink subframe, but the present invention is not limited thereto.

It should be understood that, in this embodiment of the present invention, "first" and "second" are merely used to distinguish different objects, but are not intended to limit the scope of this embodiment of the present invention. For example, the first downlink subframe represents one or more downlink subframes in which the CRS is transmitted, and the second downlink subframe represents one or more downlink subframes used to transmit common search space of a physical downlink control channel PDCCH, but the present invention is not limited thereto.

Therefore, in the information transmission method of this embodiment of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with a base station according to the downlink subframe in which the CRS is transmitted. In this way, performance of a communications system can be improved.

Besides, in the information transmission method of this embodiment of the present invention, the first downlink subframe in which the CRS is transmitted is associated with the second downlink subframe in which the PDCCH CSS is transmitted. One the one hand, a problem of how to indicate, to UE, a first downlink subframe in which a CRS is transmitted is resolved; one the other hand, because no new indication signaling needs to be introduced in the method, standard complexity can be reduced and system resources can be saved.

Figure 4:
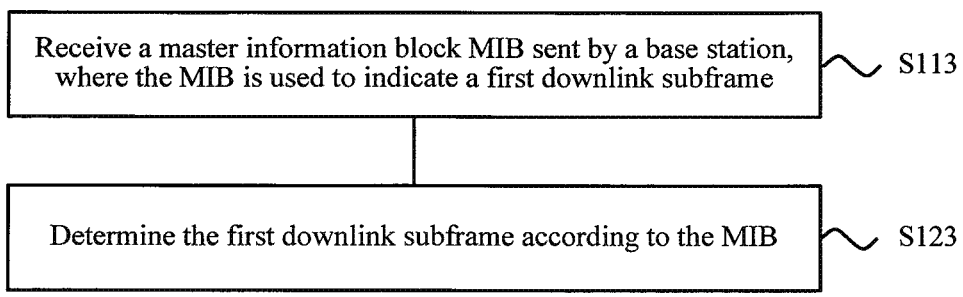
FIG. 4 is still another schematic flowchart of a method for determining a downlink subframe according to an embodiment of the present invention.

As shown in FIG. 4, in this embodiment of the present invention, optionally, the receiving indication information sent by a base station includes:

S113: Receive a master information block (MIB) sent by the base station, where the MIB is used to indicate the first downlink subframe.

The determining the first downlink subframe according to the indication information includes:

S123: Determine the first downlink subframe according to the MIB.

Specifically, in S113, the user equipment may receive a broadcast channel, so as to receive the MIB carried on the broadcast channel, where the MIB may include information used to indicate the first downlink subframe in which the CRS is transmitted. For example, the broadcast channel may be a physical broadcast channel (PBCH). In S123, the user equipment may determine the first downlink subframe according to the received MIB.

In this embodiment of the present invention, optionally, the MIB includes a CRS indicator field of 10 bits, and the CRS indicator field is used to indicate the first downlink subframe.

The determining the first downlink subframe according to the MIB includes:

determining the first downlink subframe according to the CRS indicator field included in the MIB.

For example, the MIB may include a downlink transmission bandwidth indicator field of three bits, a physical hybrid automatic repeat request indicator channel PHICH configuration information indicator field of three bits, a system frame number indicator field of eight bits, and a CRS indicator field of ten bits, and the user equipment may determine, according to a value of the CRS indicator field, the first downlink subframe in which the CRS is transmitted. Specifically, the user equipment may determine, according to the CRS indicator field and a correspondence between a value of the CRS indicator field and a downlink subframe in which the CRS is transmitted, the first downlink subframe in which the CRS is transmitted.

It should be understood that, in this embodiment of the present invention, the MIB may include the CRS indicator field used to indicate the first downlink subframe, the user equipment may determine the first downlink subframe according to the CRS indicator field, where a size of the CRS indicator field may be of another value, for example, the size of the CRS indicator field may be four bits, six bits, eight bits, or the like, and this embodiment of the present invention is not limited thereto.

In this embodiment of the present invention, optionally, the determining the first downlink subframe according to the MIB includes: determining the first downlink subframe according to the PHICH configuration information indicator field included in the MIB.

For example, the MIB may include a physical hybrid automatic repeat request indicator channel PHICH configuration information indicator field of three bits, and the user equipment may determine, according to the PHICH configuration information indicator field and a correspondence between a value of the PHICH configuration information indicator field and a downlink subframe in which the CRS is transmitted, the first downlink subframe in which the CRS is transmitted.

For example, as shown in Table 3, the user equipment may determine, according to a value ⅙ of the PHICH configuration information indicator field, that the first downlink subframe in which the CRS is transmitted is all downlink subframes; for another example, the user equipment may determine, according to a value 2 of the PHICH configuration information indicator field, that the first downlink subframe in which the CRS is transmitted is a downlink subframe 1 or a downlink subframe 6.

TABLE 3

| Value of the PHICH configuration information indicator field | Downlink subframe in which the CRS is transmitted |
|---|---|
| ⅙ | All downlink subframes |
| ½ | Downlink subframe 1, downlink subframe 2, and downlink subframe 3; or downlink subframe 6, downlink subframe 7 and downlink subframe 8 |
| 1 | Downlink subframe 1 and downlink subframe 2; or downlink subframe 6 and downlink subframe 7 |
| 2 | Downlink subframe 1 or downlink subframe 6 |

That is, in this embodiment of the present invention, the user equipment receives the master information block MIB, and may determine, according to the MIB, the first downlink subframe in which the cell-specific reference signal CRS is transmitted, so that the user equipment may perform information transmission according to the first downlink subframe. For example, the user equipment may determine, according to the CRS indicator field that is included in the MIB and that is used to indicate the first downlink subframe in which the cell-specific reference signal CRS is transmitted, the first downlink subframe in which the cell-specific reference signal CRS is transmitted; the user equipment may also determine, according to the PHICH configuration information indicator field, the first downlink subframe in which the cell-specific reference signal CRS is transmitted.

That is, in this embodiment of the present invention, the indication information used to indicate the first downlink subframe in which the CRS is transmitted is a master information block MIB, and therefore the user equipment may determine, according to the MIB, the first downlink subframe in which the CRS is transmitted.

It should be understood that, in this embodiment of the present invention, that the CRS indicator field or the PHICH configuration information indicator field included in the MIB indicates the first downlink subframe is merely used as an example for description, but the present invention is not limited thereto. Another field included in the MIB may also be used to indicate the first downlink subframe.

It should also be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Therefore, in the information transmission method of this embodiment of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with a base station according to the downlink subframe in which the CRS is transmitted. In this way, performance of a communications system can be improved.

In addition, in the information transmission method of this embodiment of the present invention, a reserved field or PHICH configuration information indicator field in an MIB is reused to indicate the first downlink subframe in which the CRS is transmitted. On the one hand, a problem of how to indicate, to UE, a first downlink subframe in which a CRS is transmitted is resolved; on the other hand, because no new indication signaling needs to be introduced in the method, standard complexity can be reduced and system resources can be saved.

The information transmission method of the embodiments of the present invention is described in detail above from the perspective of user equipment with reference to FIG. 1 to FIG. 4, and the information transmission method of the embodiments of the present invention is described in detail below from the perspective of a base station with reference to FIG. 5 and FIG. 6.

Figure 5:
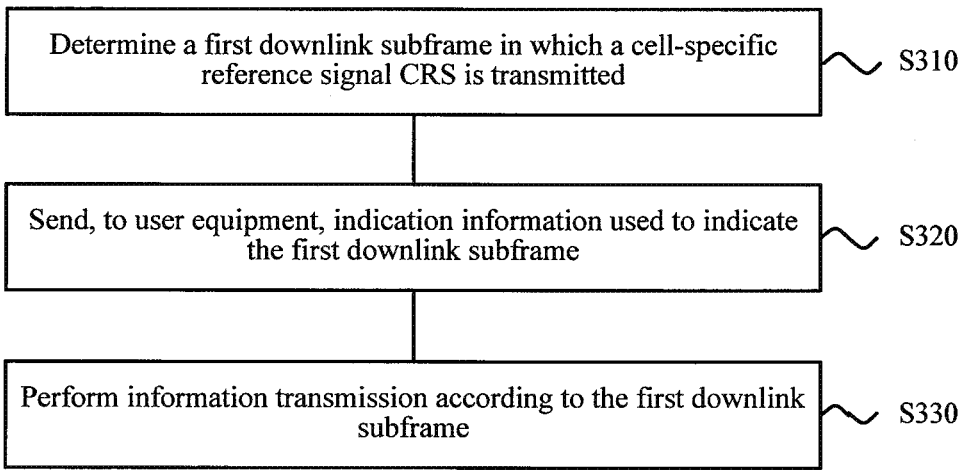
FIG. 5 is a schematic flowchart of an information transmission method according to another embodiment of the present invention.

As shown in FIG. 5, an information transmission method 300 of an embodiment of the present invention includes:

S310: Determine a first downlink subframe in which a cell-specific reference signal CRS is transmitted, S320: Send, to user equipment, indication information used to indicate the first downlink subframe.

S330: Perform information transmission according to the first downlink subframe.

That is, in this embodiment of the present invention, a base station sends indication information to the user equipment, where the indication information is used to indicate a first downlink subframe in which a cell-specific reference signal CRS is transmitted, and therefore the base station may perform information transmission according to the first downlink subframe.

Specifically, to enable the user equipment to know whether the CRS is transmitted in a downlink subframe, so as to enable the user equipment to correctly communicate with the base station, after determining the first downlink subframe in which the CRS is transmitted, the base station may use many manners to indicate the first downlink subframe to the user equipment. For example, the base station may send a downlink control channel to the user equipment, where the downlink control channel is used to indicate the first downlink subframe; the base station may also send higher layer signaling to the user equipment, so as to indicate the first downlink subframe to the user equipment; the base station may also send a broadcast channel to the user equipment, where the broadcast channel may carry indication information used to indicate the first downlink subframe. After determining the first downlink subframe in which the CRS is transmitted, the base station may perform information transmission according to the first downlink subframe, for example, the base station may transmit the CRS according to the first downlink subframe; the base station may also transmit a channel according to the first downlink subframe, for example, transmit a channel such as a PDSCH, a PDCCH, an EPDCCH, a PHICH, or the like; the base station may also transmit other information with the user equipment according to the first downlink subframe, but the present invention is not limited thereto.

Therefore, in the information transmission method of this embodiment of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with a base station according to the downlink subframe in which the CRS is transmitted. In this way, performance of a communications system can be improved.

In addition, in the information transmission method of this embodiment of the present invention, an existing channel, existing signaling, an existing message, or the like is reused to indicate, to the user equipment, the first downlink subframe in which the CRS is transmitted, which can also simplify an operation procedure and save system resources.

In this embodiment of the present invention, after determining the first downlink subframe in which the CRS is transmitted, the base station may use many manners to indicate the first downlink subframe to the user equipment, and details are described below with reference to FIG. 6.

Figure 6:
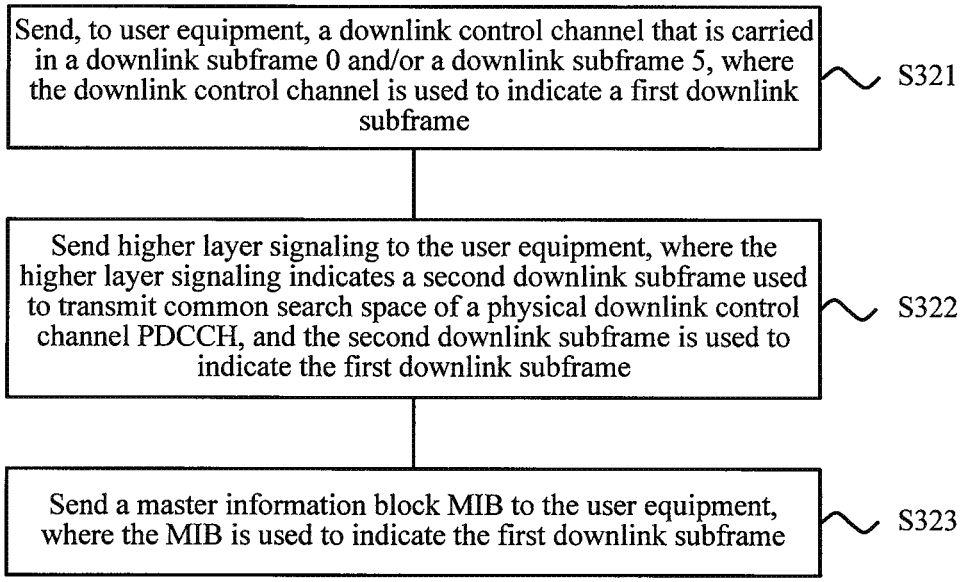
FIG. 6 is a schematic flowchart of a method for indicating a downlink subframe according to another embodiment of the present invention.

In this embodiment of the present invention, optionally, as shown in FIG. 6, the sending, to user equipment, indication information used to indicate the first downlink subframe includes:

S321: Send, to the user equipment, a downlink control channel that is carried in a downlink subframe 0 and/or a downlink subframe 5, where the downlink control channel is used to indicate the first downlink subframe.

That is, the base station sends a downlink control channel to the user equipment to indicate the first downlink subframe in which the CRS is transmitted, the downlink control channel may include the indication information used to indicate the first downlink subframe, or the downlink control channel itself is the indication information that is used by the base station to indicate the first downlink subframe to the user equipment, but the present invention is not limited thereto.

That is, in this embodiment of the present invention, the base station sends a downlink control channel to the user equipment, where the downlink control channel is carried in a downlink subframe 0 and/or a downlink subframe 5, and the downlink control channel is used to indicate the first downlink subframe in which the cell-specific reference signal CRS is transmitted, so that the base station may perform information transmission according to the first downlink subframe.

Specifically, in this embodiment of the present invention, optionally, a cyclic redundancy check CRC code of the downlink control channel is scrambled by using a first radio network temporary identifier RNTI, where the first RNTI includes at least one of a random access RNTI, a paging RNTI, and a system information RNTI, a first downlink control information DCI format used by the downlink control channel is a DCI format 1A, and a hybrid automatic repeat request HARQ process number field in the DCI format 1A is used to indicate the first downlink subframe.

In this embodiment of the present invention, the downlink control channel may be a PDCCH, or may be an EPDCCH, and a downlink control information (DCI) format used by the downlink control channel may be used to indicate the first downlink subframe. For example, a hybrid automatic repeat request (HARQ) field in the DCI format may be used to indicate the first downlink subframe, and another field in the DCI format may also be used to indicate the first downlink subframe, for example, the DCI format may include a CRS indicator field used to indicate the first downlink subframe.

Optionally, in this embodiment of the present invention, a cyclic redundancy check CRC code of the downlink control channel is scrambled by using a second radio network temporary identifier RNTI, where the second RNTI is used to indicate that the downlink control channel carries information that indicates the first downlink subframe, a second downlink control information DCI format used by the downlink control channel includes a CRS indicator field, the CRS indicator field is used to indicate the first downlink subframe, and a size of the second DCI format is the same as a size of a DCI format 1A or a DCI format 1C.

It should be understood that, in this embodiment of the present invention, the downlink control channel used to indicate the first downlink subframe may be carried in the downlink subframe 0 and/or the downlink subframe 5, so as to reduce standard complexity, but the present invention is not limited thereto; the downlink control channel used to indicate the first downlink subframe may also be carried in another downlink subframe except the downlink subframe 0 and the downlink subframe 5.

It should further be understood that, in this embodiment of the present invention, that the DCI format used by the downlink control channel indicates the first downlink subframe is merely used as an example for description, but the present invention is not limited thereto, for example, other information related to the downlink control channel may also be used for the first downlink subframe, or the downlink control channel may include indication information used to indicate the first downlink subframe.

Therefore, in the information transmission method of this embodiment of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with a base station according to the downlink subframe in which the CRS is transmitted. In this way, performance of a communications system can be improved.

In addition, in the information transmission method of this embodiment of the present invention, an existing channel, existing signaling, an existing message, or the like is reused to indicate, to the user equipment, the first downlink subframe in which the CRS is transmitted, which can also simplify an operation procedure and save system resources.

In this embodiment of the present invention, optionally, as shown in FIG. 6, the sending, to user equipment, indication information used to indicate the first downlink subframe includes:

S322: Send higher layer signaling to the user equipment, where the higher layer signaling indicates a second downlink subframe used to transmit common search space of a physical downlink control channel PDCCH, and the second downlink subframe is used to indicate the first downlink subframe.

Specifically, the base station may send higher layer signaling to the user equipment, where a second downlink subframe indicated by the higher layer signaling may further be used to indicate the first downlink subframe in which the CRS is transmitted. The first downlink subframe may be a part of downlink subframes in the second downlink subframe, or may be all downlink subframes in the second downlink subframe, or may include a downlink subframe that does not belong to the second downlink subframe, but the present invention is not limited thereto.

Optionally, the first downlink subframe in which the CRS is transmitted is the same as the second downlink subframe.

However, it should be understood that, in this embodiment of the present invention, the base station may use, according to an association relationship or a correspondence between the second downlink subframe and the first downlink subframe in which the CRS is transmitted, the second downlink subframe to indicate the first downlink subframe in which the CRS is transmitted, but the present invention is not limited thereto.

That is, in this embodiment of the present invention, the base station sends higher layer signaling to the user equipment, where the higher layer signaling indicates a second downlink subframe in which common search space of a physical downlink control channel PDCCH is transmitted; therefore, the user equipment may determine, according to the second downlink subframe, the first downlink subframe in which the cell-specific reference signal CRS is transmitted. Optionally, the user equipment determines the second downlink subframe as the first downlink subframe in which the cell-specific reference signal CRS is transmitted. Therefore, the base station may perform information transmission according to the first downlink subframe.

Optionally, in this embodiment of the present invention, as shown in FIG. 6, the sending, to user equipment, indication information used to indicate the first downlink subframe includes:

S323: Send a master information block MIB to the user equipment, where the MIB is used to indicate the first downlink subframe.

Specifically, the base station may send a broadcast channel to the user equipment, where the broadcast channel may carry the MIB, and the MIB is used to indicate the first downlink subframe. For example, the MIB may include a CRS indicator field of ten bits used to indicate the first downlink subframe, and another field included in the MIB may also be used to indicate the first downlink subframe. For example, the MIB may include a downlink transmission bandwidth indicator field of three bits, a physical hybrid automatic repeat request indicator channel PHICH configuration information indicator field of three bits, a system frame number indicator field of eight bits, and a CRS indicator field of ten bits, where the CRS indicator field is used to indicate the first downlink subframe.

In this embodiment of the present invention, optionally, the MIB includes a CRS indicator field of 10 bits, and the CRS indicator field is used to indicate the first downlink subframe.

It should be understood that, in this embodiment of the present invention, the MIB may include the CRS indicator field used to indicate the first downlink subframe, and the CRS indicator field may be used to indicate the first downlink subframe, where a size of the CRS indicator field may be of another value, for example, the size of the CRS indicator field may be four bits, six bits, eight bits, or the like, and this embodiment of the present invention is not limited thereto.

In this embodiment of the present invention, optionally, the PHICH configuration information indicator field included in the MIB is used to indicate the first downlink subframe.

For example, the MIB may include a downlink transmission bandwidth indicator field of three bits, a physical hybrid automatic repeat request indicator channel PHICH configuration information indicator field of three bits, and a system frame number indicator field of eight bits, where the PHICH configuration information indicator field is used to indicate the first downlink subframe.

That is, in this embodiment of the present invention, the base station sends the master information block MIB to the user equipment, and therefore the user equipment determines, according to the MIB, the first downlink subframe in which the cell-specific reference signal CRS is transmitted. Optionally, the user equipment may determine, according to the CRS indicator field that is included in the MIB and that is used to indicate the first downlink subframe in which the cell-specific reference signal CRS is transmitted, the first downlink subframe in which the cell-specific reference signal CRS is transmitted; the user equipment may also determine, according to the PHICH configuration information indicator field, the first downlink subframe in which the cell-specific reference signal CRS is transmitted. Therefore, the base station may perform information transmission according to the first downlink subframe.

It should be understood that, in this embodiment of the present invention, that the CRS indicator field or the PHICH configuration information indicator field included in the MIB indicates the first downlink subframe is merely used as an example for description, but the present invention is not limited thereto. Another field included in the MIB may also be used to indicate the first downlink subframe.

It should be understood that, in this embodiment of the present invention, the first downlink subframe indicated by the base station to the user equipment may include the downlink subframe 0 and the downlink subframe 5 in which the CRS is transmitted in the DTX technology, or may include a downlink subframe in a radio subframe except the downlink subframe 0 and the downlink subframe 5, where the CRS is transmitted in the downlink subframe. This embodiment of the present invention is not limited thereto.

It should further be understood that, this embodiment of the present invention only uses the DTX technology as an example for description, but the present invention is not limited thereto. The information transmission method based on this embodiment of the present invention may also be applied to another technology, so that the user equipment can know whether the CRS is transmitted in a downlink subframe, and can correctly communicate with the base station. In this way, performance of a communications system can be improved.

It should also be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

Therefore, in the information transmission method of this embodiment of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with a base station according to the downlink subframe in which the CRS is transmitted. In this way, performance of a communications system can be improved.

In addition, in the information transmission method of this embodiment of the present invention, an existing channel, existing signaling, an existing message, or the like is reused to indicate, to the user equipment, the first downlink subframe in which the CRS is transmitted, which can also simplify an operation procedure and save system resources.

The information transmission method of the embodiments of the present invention is described in detail above with reference to FIG. 1 to FIG. 6, and user equipment and a base station of the embodiments of the present invention are described in detail below with reference to FIG. 7 and FIG. 14.

Figure 7:
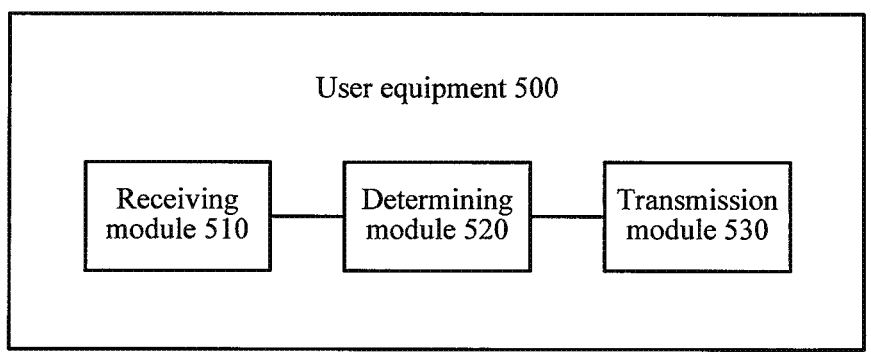
FIG. 7 is a schematic block diagram of user equipment according to an embodiment of the present invention.

As shown in FIG. 7, user equipment 500 of an embodiment of the present invention includes:

a receiving module 510, configured to receive indication information sent by a base station, where the indication information is used to indicate a first downlink subframe in which a cell-specific reference signal CRS is transmitted;

a determining module 520, configured to determine the first downlink subframe according to the indication information received by the receiving module 510; and a transmission module 530, configured to perform information transmission according to the first downlink subframe determined by the determining module 520.

Therefore, in the user equipment of this embodiment of the present invention, indication information is used to indicate a downlink subframe in which a cell-specific reference signal is transmitted, so that the user equipment can know, according to the indication information, the downlink subframe in which the CRS is transmitted, and therefore the user equipment can correctly communicate with a base station according to the downlink subframe in which the CRS is transmitted. In this way, performance of a communications system can be improved.

In addition, in the user equipment of this embodiment of the present invention, an existing channel, existing signaling, an existing message, or the like is reused to indicate, to the user equipment, the first downlink subframe in which the CRS is transmitted, which can also simplify an operation procedure and save system resources.

Figure 8:
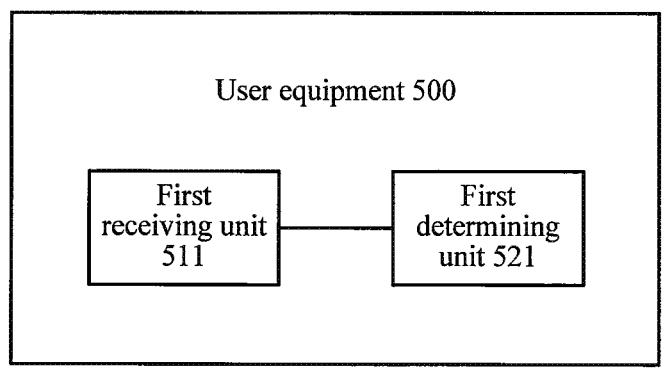
FIG. 8 is another schematic block diagram of user equipment according to an embodiment of the present invention.

In this embodiment of the present invention, optionally, as shown in FIG. 8, the receiving module 510 includes:

a first receiving unit 511, configured to receive a downlink control channel that is sent by the base station and that is carried in a downlink subframe 0 and/or a downlink subframe 5, where the downlink control channel is used to indicate the first downlink subframe; and the determining module 520 includes:

a first determining unit 521, configured to determine the first downlink subframe according to the downlink control channel received by the first receiving unit 511.

Optionally, in this embodiment of the present invention, a cyclic redundancy check CRC code of the downlink control channel received by the first receiving unit 511 is scrambled by using a first radio network temporary identifier RNTI, where the first RNTI includes at least one of a random access RNTI, a paging RNTI, and a system information RNTI, and a first downlink control information DCI format used by the downlink control channel is a DCI format 1A; and the first determining unit 521 is specifically configured to determine the first downlink subframe according to a hybrid automatic repeat request HARQ process number field in the DCI format 1A.

Optionally, in this embodiment of the present invention, a cyclic redundancy check CRC code of the downlink control channel received by the first receiving unit 511 is scrambled by using a second radio network temporary identifier RNTI, where the second RNTI is used to indicate that the downlink control channel carries information that indicates the first downlink subframe, a second downlink control information DCI format used by the downlink control channel includes a CRS indicator field, the CRS indicator field is used to indicate the first downlink subframe, and a size of the second DCI format is the same as a size of a DCI format 1A or a DCI format 1C; and the first determining unit 521 is specifically configured to determine the first downlink subframe according to the CRS indicator field.

Figure 9:
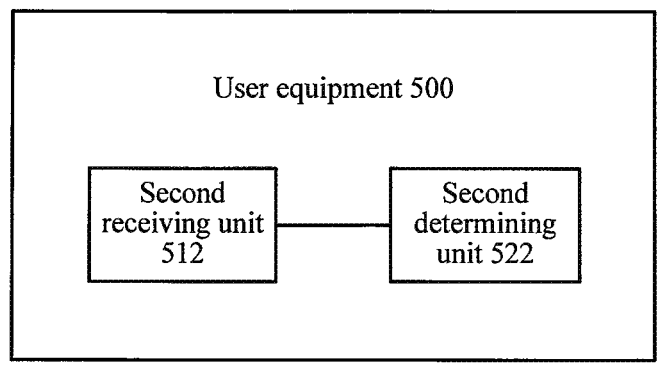
FIG. 9 is still another schematic block diagram of user equipment according to an embodiment of the present invention.

In this embodiment of the present invention, optionally, as shown in FIG. 9, the receiving module 510 includes:

a second receiving unit 512, configured to receive higher layer signaling sent by the base station, where the higher layer signaling indicates a second downlink subframe used to transmit common search space of a physical downlink control channel PDCCH, and the second downlink subframe is used to indicate the first downlink subframe; and the determining module 520 includes:

a second determining unit 522, configured to determine the first downlink subframe according to the second downlink subframe indicated by the higher layer signaling received by the second receiving unit 512.

Optionally, the second determining unit 522 is specifically configured to determine, as the first downlink subframe in which the CRS is transmitted, the second downlink subframe indicated by the higher layer signaling received by the second receiving unit 512.

Figure 10:
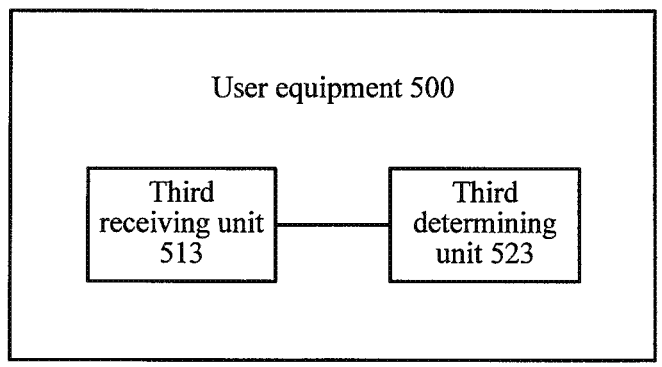
FIG. 10 is yet another schematic block diagram of user equipment according to an embodiment of the present invention.

In this embodiment of the present invention, optionally, as shown in FIG. 10, the receiving module 510 includes:

a third receiving unit 513, configured to receive a master information block MIB sent by the base station, where the MIB is used to indicate the first downlink subframe; and the determining module 520 includes:

a third determining unit 523, configured to determine the first downlink subframe according to the MIB received by the third receiving unit 513.

Optionally, the MIB received by the third receiving unit 513 includes a CRS indicator field of 10 bits, and the CRS indicator field is used to indicate the first downlink subframe; and the third determining unit 523 is specifically configured to determine the first downlink subframe according to the CRS indicator field included in the MIB received by the third receiving unit.

The user equipment 500 according to this embodiment of the present invention may correspond to the user equipment in the embodiments of the present invention, the foregoing and other operations and/or functions of the modules in the user equipment 500 are for implementing corresponding procedures in the methods in FIG. 1 to FIG. 6, and for convenience, details are not described herein again.

Therefore, in the user equipment of this embodiment of the present invention, indication information is used to indicate a downlink subframe in which a cell-specific reference signal is transmitted, so that the user equipment can know, according to the indication information, the downlink subframe in which the CRS is transmitted, and therefore the user equipment can correctly communicate with a base station according to the downlink subframe in which the CRS is transmitted. In this way, performance of a communications system can be improved.

In addition, in the user equipment of this embodiment of the present invention, an existing channel, existing signaling, an existing message, or the like is reused to indicate, to the user equipment, the first downlink subframe in which the CRS is transmitted, which can also simplify an operation procedure and save system resources.

Figure 11:
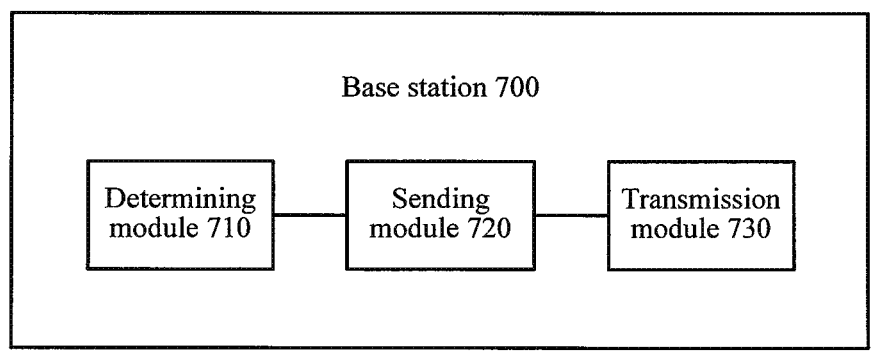
FIG. 11 is a schematic block diagram of a base station according to an embodiment of the present invention.

FIG. 11 is a schematic block diagram of a base station 700 according to an embodiment of the present invention. As shown in FIG. 11, the base station 700 includes:

a determining module 710, configured to determine a first downlink subframe in which a cell-specific reference signal CRS is transmitted;

a sending module 720, configured to send, to user equipment, indication information used to indicate the first downlink subframe determined by the determining module 710; and a transmission module 730, configured to perform information transmission according to the first downlink subframe determined by the determining module 710.

Therefore, in the base station of this embodiment of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with the base station according to the downlink subframe in which the CRS is transmitted. In this way, performance of a communications system can be improved.

In addition, in the base station of this embodiment of the present invention, an existing channel, existing signaling, an existing message, or the like is reused to indicate, to the user equipment, the first downlink subframe in which the CRS is transmitted, which can also simplify an operation procedure and save system resources.

Figure 12:
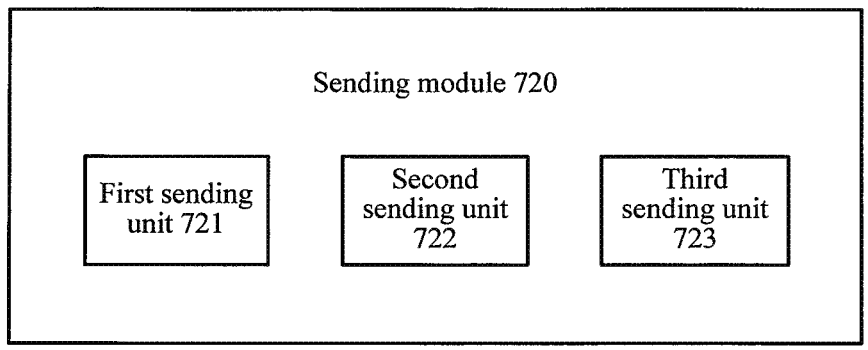
FIG. 12 is a schematic block diagram of a sending module according to an embodiment of the present invention.

In this embodiment of the present invention, optionally, as shown in FIG. 12, the sending module 720 includes:

a first sending unit 721, configured to send, to the user equipment, a downlink control channel that is carried in a downlink subframe 0 and/or a downlink subframe 5, where the downlink control channel is used to indicate the first downlink subframe.

Optionally, a cyclic redundancy check CRC code of the downlink control channel sent by the first sending unit 721 is scrambled by using a first radio network temporary identifier RNTI, where the first RNTI includes at least one of a random access RNTI, a paging RNTI, and a system information RNTI, a first downlink control information DCI format used by the downlink control channel is a DCI format 1A, and a hybrid automatic repeat request HARQ process number field in the DCI format 1A is used to indicate the first downlink subframe.

Optionally, a cyclic redundancy check CRC code of the downlink control channel sent by the first sending unit 721 is scrambled by using a second radio network temporary identifier RNTI, where the second RNTI is used to indicate that the downlink control channel carries information that indicates the first downlink subframe, a second downlink control information DCI format used by the downlink control channel includes a CRS indicator field, the CRS indicator field is used to indicate the first downlink subframe, and a size of the second DCI format is the same as a size of a DCI format 1A or a DCI format 1C.

In this embodiment of the present invention, optionally, as shown in FIG. 12, the sending module 720 includes:

a second sending unit 722, configured to send higher layer signaling to the user equipment, where the higher layer signaling indicates a second downlink subframe used to transmit common search space of a physical downlink control channel PDCCH, and the second downlink subframe is used to indicate the first downlink subframe.

Optionally, the second downlink subframe indicated by the higher layer signaling sent by the second sending unit 722 is the same as the first downlink subframe in which the CRS is transmitted.

In this embodiment of the present invention, optionally, as shown in FIG. 12, the sending module 720 includes:

a third sending unit 723, configured to send a master information block MIB to the user equipment, where the MIB is used to indicate the first downlink subframe.

Optionally, the MIB sent by the third sending unit 723 includes a CRS indicator field of 10 bits, and the CRS indicator field is used to indicate the first downlink subframe.

The base station 700 according to this embodiment of the present invention may correspond to the base station in the embodiments of the present invention, the foregoing and other operations and/or functions of the modules in the base station 700 are for implementing corresponding procedures in the methods in FIG. 1 to FIG. 6, and for convenience, details are not described herein again.

Therefore, in the base station of this embodiment of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with the base station according to the downlink subframe in which the CRS is transmitted. In this way, performance of a communications system can be improved.

In addition, in the base station of this embodiment of the present invention, an existing channel, existing signaling, an existing message, or the like is reused to indicate, to the user equipment, the first downlink subframe in which the CRS is transmitted, which can also simplify an operation procedure and save system resources.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in this embodiment of the present invention, "B corresponding to A" represents that B is associated with A, and B may be determined according to A. However, it should further be understood that, determining B according to A does not mean that B is determined according to A only, but B may also be determined according to A and/or other information.

Figure 13:
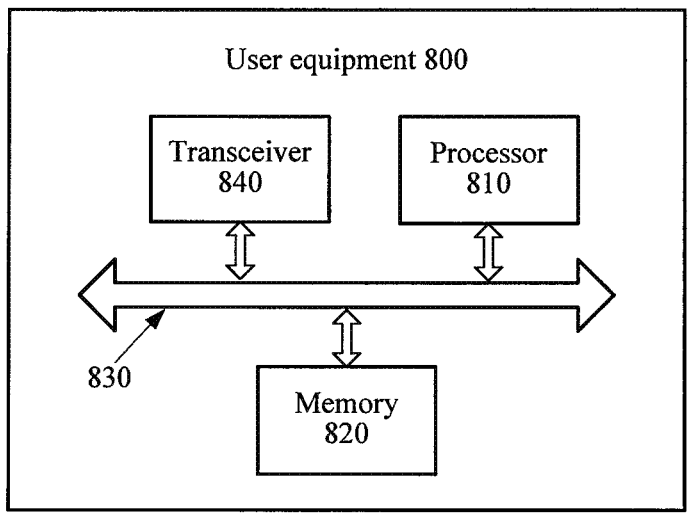
FIG. 13 is a schematic block diagram of user equipment according to another embodiment of the present invention.

As shown in FIG. 13, an embodiment of the present invention further provides user equipment 800. The user equipment 800 includes a processor 810, a memory 820, a bus system 830, and a transceiver 840. The processor 810, the memory 820 and the transceiver 840 are connected by using the bus system 830, the memory 820 is configured to store an instruction, and the processor 810 is configured to execute the instruction stored by the memory 820, to control the transceiver 840 to receive a signal or send a signal. The transceiver 840 is configured to receive indication information sent by a base station, where the indication information is used to indicate a first downlink subframe in which a cell-specific reference signal CRS is transmitted; the processor 810 is configured to determine the first downlink subframe according to the indication information; and the transceiver 840 is further configured to perform information transmission according to the first downlink subframe.

Therefore, in the user equipment of this embodiment of the present invention, indication information is used to indicate a downlink subframe in which a cell-specific reference signal is transmitted, so that the user equipment can know, according to the indication information, the downlink subframe in which the CRS is transmitted, and therefore the user equipment can correctly communicate with a base station according to the downlink subframe in which the CRS is transmitted. In this way, performance of a communications system can be improved.

In addition, in the user equipment of this embodiment of the present invention, an existing channel, existing signaling, an existing message, or the like is reused to indicate, to the user equipment, the first downlink subframe in which the CRS is transmitted, which can also simplify an operation procedure and save system resources.

It should be understood that in the embodiment of the present invention, the processor 810 may be a central processing unit (CPU), or the processor 810 may be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor or the processor may be any conventional processor and the like.

The memory 820 may include a read-only memory and a random access memory, and provides an instruction and data to the processor 810. A part of the memory 820 may further include a non-volatile random access memory. For example, the memory 820 may further store device type information.

The bus system 830 may include a power bus, a control bus, a status signal bus, and the like in addition to a data bus. However, for clear description, various types of buses in the figure are marked as the bus system 830.

In an implementation process, steps in the foregoing methods may be completed by using an integrated logic circuit in a form of hardware or an instruction in a form of software in the processor 810. The steps of the methods disclosed in the embodiments of the present invention may be directly completed and performed by a hardware processor, or be completed and performed by combination of hardware and software modules in a processor. The software modules may be located in a mature storage medium in the art, such as a random access memory, a flash memory, a read-only memory, a programmable read-only memory, an electronically erasable programmable memory, or a register. The storage medium is located in the memory 820. The processor 810 reads information in the memory 820, and completes the steps of the foregoing methods by combining using of the hardware of the processor 810. To avoid repetition, details are not described herein again.

Optionally, as an embodiment, the receiving, by the transceiver 840, indication information sent by a base station includes:

receiving a downlink control channel that is sent by the base station and that is carried in a downlink subframe 0 and/or a downlink subframe 5, where the downlink control channel is used to indicate the first downlink subframe; and the determining, by the processor 810, the first downlink subframe according to the indication information includes:

determining the first downlink subframe according to the downlink control channel.

Optionally, as an embodiment, a cyclic redundancy check CRC code of the downlink control channel is scrambled by using a first radio network temporary identifier RNTI, where the first RNTI includes at least one of a random access RNTI, a paging RNTI, and a system information RNTI, and a first downlink control information DCI format used by the downlink control channel is a DCI format 1A; and the determining, by the processor 810, the first downlink subframe according to the downlink control channel includes:

determining the first downlink subframe according to a hybrid automatic repeat request HARQ process number field in the DCI format 1A.

Optionally, as an embodiment, a cyclic redundancy check CRC code of the downlink control channel is scrambled by using a second radio network temporary identifier RNTI, where the second RNTI is used to indicate that the downlink control channel carries information that indicates the first downlink subframe, a second downlink control information DCI format used by the downlink control channel includes a CRS indicator field, the CRS indicator field is used to indicate the first downlink subframe, and a size of the second DCI format is the same as a size of a DCI format 1A or a DCI format 1C; and the determining, by the processor 810, the first downlink subframe according to the downlink control channel includes:

determining the first downlink subframe according to the CRS indicator field.

Optionally, as an embodiment, the receiving, by the transceiver 840, indication information sent by a base station includes:

receiving higher layer signaling sent by the base station, where the higher layer signaling indicates a second downlink subframe used to transmit common search space of a physical downlink control channel PDCCH, and the second downlink subframe is used to indicate the first downlink subframe; and the determining, by the processor 810, the first downlink subframe according to the indication information includes:

determining the first downlink subframe according to the second downlink subframe.

Optionally, as an embodiment, the determining, by the processor 810, the first downlink subframe according to the second downlink subframe includes:

determining the second downlink subframe as the first downlink subframe in which the CRS is transmitted.

Optionally, as an embodiment, the receiving, by the transceiver 840, indication information sent by a base station includes:

receiving a master information block MIB sent by the base station, where the MIB is used to indicate the first downlink subframe; and the determining, by the processor 810, the first downlink subframe according to the indication information includes:

determining the first downlink subframe according to the MIB.

Optionally, as an embodiment, the MIB includes a CRS indicator field of 10 bits, and the CRS indicator field is used to indicate the first downlink subframe; and the determining, by the processor 810, the first downlink subframe according to the MIB includes:

determining the first downlink subframe according to the CRS indicator field included in the MIB.

The user equipment 800 according to this embodiment of the present invention may correspond to an execution body that executes the method of the embodiments of the present invention and the user equipment 500, the foregoing and other operations and/or functions of the modules in the user equipment 800 are for implementing corresponding procedures in the methods in FIG. 1 to FIG. 6, and for convenience, details are not described herein again.

Therefore, in the user equipment of this embodiment of the present invention, indication information is used to indicate a downlink subframe in which a cell-specific reference signal is transmitted, so that the user equipment can know, according to the indication information, the downlink subframe in which the CRS is transmitted, and therefore the user equipment can correctly communicate with a base station according to the downlink subframe in which the CRS is transmitted. In this way, performance of a communications system can be improved.

In addition, in the user equipment of this embodiment of the present invention, an existing channel, existing signaling, an existing message, or the like is reused to indicate, to the user equipment, the first downlink subframe in which the CRS is transmitted, which can also simplify an operation procedure and save system resources.

Figure 14:
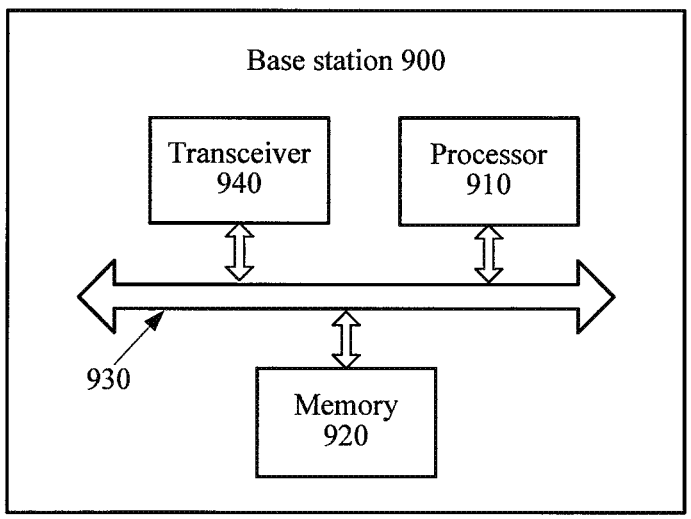
FIG. 14 is a schematic block diagram of a base station according to another embodiment of the present invention.

As shown in FIG. 14, an embodiment of the present invention further provides a base station 900. The base station 900 includes a processor 910, a memory 920, a bus system 930, and a transceiver 940. The processor 910, the memory 920 and the transceiver 940 are connected by using the bus system 930, the memory 920 is configured to store an instruction, and the processor 910 is configured to execute the instruction stored by the memory 920, to control the transceiver 940 to receive a signal or send a signal. The processor 910 is configured to determine a first downlink subframe in which a cell-specific reference signal CRS is transmitted; the transceiver 940 is configured to send, to user equipment, indication information used to indicate the first downlink subframe; and the transceiver 940 is further configured to perform information transmission according to the first downlink subframe.

Therefore, in the base station of this embodiment of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with the base station according to the downlink subframe in which the CRS is transmitted. In this way, performance of a communications system can be improved.

In addition, in the base station of this embodiment of the present invention, an existing channel, existing signaling, an existing message, or the like is reused to indicate, to the user equipment, the first downlink subframe in which the CRS is transmitted, which can also simplify an operation procedure and save system resources.

It should be understood that in the embodiment of the present invention, the processor 910 may be a central processing unit (CPU), or the processor 910 may be another general purpose processor, a digital signal processor (DSP), an application-specific integrated circuit (ASIC), a field programmable gate array (FPGA), or another programmable logical device, discrete gate or transistor logical device, discrete hardware component, or the like. The general purpose processor may be a microprocessor or the processor may be any conventional processor and the like.

The memory 920 may include a read-only memory and a random access memory, and provides an instruction and data to the processor 910. A part of the memory 920 may further include a non-volatile random access memory. For example, the memory 920 may further store device type information.

The bus system 930 may include a power bus, a control bus, a status signal bus, and the like in addition to a data bus. However, for clear description, various types of buses in the figure are marked as the bus system 930.

In an implementation process, steps in the foregoing methods may be completed by using an integrated logic circuit in a form of hardware or an instruction in a form of software in the processor 910. The steps of the methods disclosed in the embodiments of the present invention may be directly completed and performed by a hardware processor, or be completed and performed by combination of hardware and software modules in a processor. The software modules may be located in a mature storage medium in the art, such as a random access memory, a flash memory, a read-only memory, a programmable read-only memory, an electronically erasable programmable memory, or a register. The storage medium is located in the memory 920. The processor 910 reads information in the memory 920, and completes the steps of the foregoing methods by combining using of the hardware of the processor 910. To avoid repetition, details are not described herein again.

Optionally, as an embodiment, the sending, by the transceiver 940 to user equipment, indication information used to indicate the first downlink subframe includes:

sending, to the user equipment, a downlink control channel that is carried in a downlink subframe 0 and/or a downlink subframe 5, where the downlink control channel is used to indicate the first downlink subframe.

Optionally, as an embodiment, a cyclic redundancy check CRC code of the downlink control channel sent by the transceiver 940 is scrambled by using a first radio network temporary identifier RNTI, where the first RNTI includes at least one of a random access RNTI, a paging RNTI, and a system information RNTI, a first downlink control information DCI format used by the downlink control channel is a DCI format 1A, and a hybrid automatic repeat request HARQ process number field in the DCI format 1A is used to indicate the first downlink subframe.

Optionally, as an embodiment, a cyclic redundancy check CRC code of the downlink control channel sent by the transceiver 940 is scrambled by using a second radio network temporary identifier RNTI, where the second RNTI is used to indicate that the downlink control channel carries information that indicates the first downlink subframe, a second downlink control information DCI format used by the downlink control channel includes a CRS indicator field, the CRS indicator field is used to indicate the first downlink subframe, and a size of the second DCI format is the same as a size of a DCI format 1A or a DCI format 1C.

Optionally, as an embodiment, the sending, by the transceiver 940 to user equipment, indication information used to indicate the first downlink subframe includes:

sending higher layer signaling to the user equipment, where the higher layer signaling indicates a second downlink subframe used to transmit common search space of a physical downlink control channel PDCCH, and the second downlink subframe is used to indicate the first downlink subframe.

Optionally, as an embodiment, the first downlink subframe in which the CRS is transmitted is the same as the second downlink subframe.

Optionally, as an embodiment, the sending, by the transceiver 940 to user equipment, indication information used to indicate the first downlink subframe includes:

sending a master information block MIB to the user equipment, where the MIB is used to indicate the first downlink subframe.

Optionally, as an embodiment, the MIB includes a CRS indicator field of 10 bits, and the CRS indicator field is used to indicate the first downlink subframe.

The base station 900 according to this embodiment of the present invention may correspond to an execution body that executes the method of the embodiments of the present invention and the base station 700, the foregoing and other operations and/or functions of the modules in the base station 900 are for implementing corresponding procedures in the methods in FIG. 1 to FIG. 6, and for convenience, details are not described herein again.

Therefore, in the base station of this embodiment of the present invention, indication information is used to indicate a downlink subframe in which a cell-specific reference signal is transmitted, so that user equipment can know, according to the indication information, the downlink subframe in which the CRS is transmitted, and therefore the user equipment can correctly communicate with the base station according to the downlink subframe in which the CRS is transmitted. In this way, performance of a communications system can be improved.

In addition, in the base station of this embodiment of the present invention, an existing channel, existing signaling, an existing message, or the like is reused to indicate, to the user equipment, the first downlink subframe in which the CRS is transmitted, which can also simplify an operation procedure and save system resources.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information transmission method, comprising:
    receiving indication information sent by a base station including receiving a downlink control channel sent by the base station and carried in a downlink subframe 0 and/or a downlink subframe 5, wherein the indication information is used to indicate a first downlink subframe in which a cell-specific reference signal (CRS) is transmitted and the downlink control channel is used to indicate the first downlink subframe;
    determining the first downlink subframe according to the indication information including determining the first downlink subframe according to the downlink control channel, wherein the indication information includes a hybrid automatic repeat request (HARQ) process number field, and:
        when a value of the HARQ process number field is a first value, the first downlink subframe is a downlink subframe 1 and a downlink subframe 6,
        when the value of the HARQ process number field is a second value, the first downlink subframe is the downlink subframe 1, a downlink subframe 2, the downlink subframe 6, and a downlink subframe 7, and
        when the value of the HARQ process number field is a third value, the first downlink subframe is all downlink subframes; and
    performing information transmission according to the first downlink subframe.

2. An information transmission method, comprising:
    receiving indication information sent by a base station including receiving a downlink control channel sent by the base station and carried in a downlink subframe 0 and/or a downlink subframe 5, wherein the indication information is used to indicate a first downlink subframe in which a cell-specific reference signal (CRS) is transmitted and the downlink control channel is used to indicate the first downlink subframe;
    determining the first downlink subframe according to the indication information including determining the first downlink subframe according to the downlink control channel and a hybrid automatic repeat request (HARQ) process number field in downlink control information (DCI) format 1A; and
    performing information transmission according to the first downlink subframe, wherein a cyclic redundancy check (CRC) code of the downlink control channel is scrambled by using a first radio network temporary identifier (RNTI) comprising at least one of a random access RNTI, a paging RNTI, and a system information RNTI, and wherein a first downlink control information (DCI) format used by the downlink control channel is a DCI format 1A.

3. An information transmission method, comprising:
    receiving indication information sent by a base station including receiving a downlink control channel sent by the base station and carried in a downlink subframe 0 and/or a downlink subframe 5, wherein the indication information is used to indicate a first downlink subframe in which a cell-specific reference signal (CRS) is transmitted and the downlink control channel is used to indicate the first downlink subframe;
    determining the first downlink subframe according to the indication information including determining the first downlink subframe according to the downlink control channel according to a CRS indicator field; and
    performing information transmission according to the first downlink subframe, wherein:
    a cyclic redundancy check (CRC) code of the downlink control channel is scrambled by using a second radio network temporary identifier RNTI, wherein the second RNTI is used to indicate that the downlink control channel carries information that indicates the first downlink subframe, a second downlink control information (DCI) format used by the downlink control channel comprises the CRS indicator field, the CRS indicator field is used to indicate the first downlink subframe, and a size of the second DCI format is the same as a size of a DCI format 1A or a DCI format 1C.

4. An information transmission method, comprising:
receiving indication information sent by a base station by receiving higher layer signaling sent by the base station, wherein the indication information is used to indicate a first downlink subframe in which a cell-specific reference signal (CRS) is transmitted, the higher layer signaling indicates a second downlink subframe used to transmit common search space of a physical downlink control channel (PDCCH), and the second downlink subframe is used to indicate the first downlink subframe;
determining the first downlink subframe according to the indication information by determining the first downlink subframe according to the second downlink subframe; and
performing information transmission according to the first downlink subframe.

5. An information transmission method, comprising:
determining a first downlink subframe in which a cell-specific reference signal (CRS) is transmitted;
sending, to user equipment, indication information used to indicate the first downlink subframe, including sending, to the user equipment, a downlink control channel that is carried in a downlink subframe 0 and/or a downlink subframe 5, wherein the downlink control channel is used to indicate the first downlink subframe, wherein the indication information includes a hybrid automatic repeat request (HARQ) process number field, and:
when a value of the HARQ process number field is a first value, the first downlink subframe is a downlink subframe 1 and a downlink subframe 6,
when a value of the HARQ process number field is a second value, the first downlink subframe is the downlink subframe 1, a downlink subframe 2, the downlink subframe 6, and a downlink subframe 7, and
when the value of the HARQ process number field is a third value, the first downlink subframe is all downlink subframes; and
performing information transmission according to the first downlink subframe.

6. An information transmission method, comprising:
determining a first downlink subframe in which a cell-specific reference signal (CRS) is transmitted;
sending, to user equipment, indication information used to indicate the first downlink subframe, including sending, to the user equipment, a downlink control channel that is carried in a downlink subframe 0 and/or a downlink subframe 5, wherein the downlink control channel is used to indicate the first downlink subframe; and
performing information transmission according to the first downlink subframe,
wherein a cyclic redundancy check (CRC) code of the downlink control channel is scrambled by using a first radio network temporary identifier (RNTI) comprising at least one of a random access RNTI, a paging RNTI, and a system information RNTI, wherein a first downlink control information (DCI) format used by the downlink control channel is a DCI format 1A, and a hybrid automatic repeat request (HARQ) process number field in the DCI format 1A is used to indicate the first downlink subframe.

7. An information transmission method, comprising:
determining a first downlink subframe in which a cell-specific reference signal (CRS) is transmitted;
sending, to user equipment, indication information used to indicate the first downlink subframe, including sending, to the user equipment, a downlink control channel that is carried in a downlink subframe 0 and/or a downlink subframe 5, wherein the downlink control channel is used to indicate the first downlink subframe; and
performing information transmission according to the first downlink subframe,
wherein the cyclic redundancy check (CRC) code of the downlink control channel is scrambled by using a second radio network temporary identifier RNTI, wherein the second RNTI is used to indicate that the downlink control channel carries information that indicates the first downlink subframe, a second downlink control information (DCI) format used by the downlink control channel comprises a CRS indicator field, the CRS indicator field is used to indicate the first downlink subframe, and a size of the second DCI format is the same as a size of a DCI format 1A or a DCI format 1C.

8. An information transmission method, comprising:
determining a first downlink subframe in which a cell-specific reference signal (CRS) is transmitted, including sending higher layer signaling to the user equipment, wherein the higher layer signaling indicates a second downlink subframe used to transmit common search space of a physical downlink control channel (PDCCH), and the second downlink subframe is used to indicate the first downlink subframe;
sending, to user equipment, indication information used to indicate the first downlink subframe; and
performing information transmission according to the first downlink subframe.

9. User equipment, comprising:
a transceiver configured to:
receive indication information sent by a base station, wherein the indication information is used to indicate a first downlink subframe in which a cell-specific reference signal (CRS) is transmitted, and
receive a downlink control channel sent by the base station and carried in a downlink subframe 0 and/or a downlink subframe 5, wherein the downlink control channel is used to indicate the first downlink subframe;
a processor configured to determine the first downlink subframe according to the indication information received by the transceiver including the downlink control channel received by the transceiver, wherein the indication information includes a hybrid automatic repeat request (HARQ) process number field, and:
when a value of the HARQ process number field is a first value, the first downlink subframe is a downlink subframe 1 and a downlink subframe 6,
when the value of the HARQ process number field is a second value, the first downlink subframe is the downlink subframe 1, a downlink subframe 2, the downlink subframe 6, and a downlink subframe 7, and
when the value of the HARQ process number field is a third value, the first downlink subframe is all downlink subframes; and
wherein the transceiver is configured to perform information transmission according to the first downlink subframe determined by the processor.

10. User equipment, comprising:
a transceiver configured to:
receive indication information sent by a base station, wherein the indication information is used to indicate a first downlink subframe in which a cell-specific reference signal (CRS) is transmitted, and
receive a downlink control channel sent by the base station and carried in a downlink subframe 0 and/or a downlink subframe 5, wherein the downlink control channel is used to indicate the first downlink subframe, wherein:
a cyclic redundancy check (CRC) code of the downlink control channel received by the transceiver is scrambled by using a first radio network temporary identifier (RNTI) comprising at least one of a random access RNTI, a paging RNTI, and a system information RNTI, and wherein a first downlink control information (DCI) format used by the downlink control channel is a DCI format 1A;
a processor configured to determine the first downlink subframe according to the indication information received by the transceiver including the downlink control channel received by the transceiver and according to a hybrid automatic repeat request (HARQ) process number field in the DCI format 1A; and
wherein the transceiver is configured to perform information transmission according to the first downlink subframe determined by the processor.

11. User equipment, comprising:
a transceiver configured to:
receive indication information sent by a base station, wherein the indication information is used to indicate a first downlink subframe in which a cell-specific reference signal (CRS) is transmitted, and
receive a downlink control channel sent by the base station and carried in a downlink subframe 0 and/or a downlink subframe 5, wherein the downlink control channel is used to indicate the first downlink subframe, wherein:
a cyclic redundancy check (CRC) code of the downlink control channel received by the transceiver is scrambled by using a second radio network temporary identifier (RNTI), wherein the second RNTI is used to indicate that the downlink control channel carries information that indicates the first downlink subframe, a second downlink control information (DCI) format used by the downlink control channel comprises a CRS indicator field, the CRS indicator field is used to indicate the first downlink subframe, and a size of the second DCI format is the same as a size of a DCI format 1A or a DCI format 1C;
a processor configured to determine the first downlink subframe according to the indication information received by the transceiver including the downlink control channel received by the transceiver and according to the CRS indicator field; and
wherein the transceiver is configured to perform information transmission according to the first downlink subframe determined by the processor.

12. User equipment, comprising:
a transceiver, configured to:
receive indication information sent by a base station, wherein the indication information is used to indicate a first downlink subframe in which a cell-specific reference signal (CRS) is transmitted, and
receive higher layer signaling sent by the base station, wherein the higher layer signaling indicates a second downlink subframe used to transmit common search space of a physical downlink control channel (PDCCH), and the second downlink subframe is used to indicate the first downlink subframe;
a processor configured to determine the first downlink subframe according to the indication information received by the transceiver and to determine the first downlink subframe according to the second downlink subframe indicated by the higher layer signaling received by the transceiver; and
wherein the transceiver is further configured to perform information transmission according to the first downlink subframe determined by the processor.

13. A base station, comprising:
a processor, configured to determine a first downlink subframe in which a cell-specific reference signal (CRS) is transmitted;
a transceiver, configured to:
send, to user equipment, indication information used to indicate the first downlink subframe determined by the processor, wherein the indication information includes a hybrid automatic repeat request (HARQ) process number field, and:
when a value of the HARQ process number field is a first value, the first downlink subframe is a downlink subframe 1 and a downlink subframe 6,
when the value of the HARQ process number field is a second value, the first downlink subframe is the downlink subframe 1, a downlink subframe 2, the downlink subframe 6, and a downlink subframe 7, and
when the value of the HARQ process number field is a third value, the first downlink subframe is all downlink subframes,
send, to the user equipment, a downlink control channel carried in a downlink subframe 0 and/or a downlink subframe 5, wherein the downlink control channel is used to indicate the first downlink subframe, and
perform information transmission according to the first downlink subframe determined by the processor.

14. A base station, comprising:
a processor, configured to determine a first downlink subframe in which a cell-specific reference signal (CRS) is transmitted;
a transceiver, configured to:
send, to user equipment, indication information used to indicate the first downlink subframe determined by the processor,
send, to the user equipment, a downlink control channel carried in a downlink subframe 0 and/or a downlink subframe 5, wherein the downlink control channel is used to indicate the first downlink subframe, and
perform information transmission according to the first downlink subframe determined by the processor,
wherein a cyclic redundancy check (CRC) code of the downlink control channel sent by the transceiver is scrambled by using a first radio network temporary identifier (RNTI) comprising at least one of a random access RNTI, a paging RNTI, and a system information RNTI, wherein a first downlink control information (DCI) format used by the downlink control channel is a DCI format 1A, and a hybrid automatic repeat request (HARQ) process number field in the DCI format 1A is used to indicate the first downlink subframe.

15. A base station, comprising:
a processor, configured to determine a first downlink subframe in which a cell-specific reference signal (CRS) is transmitted;
a transceiver, configured to:
  send, to user equipment, indication information used to indicate the first downlink subframe determined by the processor,
  send, to the user equipment, a downlink control channel carried in a downlink subframe 0 and/or a downlink subframe 5, wherein the downlink control channel is used to indicate the first downlink subframe, and
perform information transmission according to the first downlink subframe determined by the processor,
wherein a cyclic redundancy check (CRC) code of the downlink control channel sent by the transceiver is scrambled by using a second radio network temporary identifier (RNTI), wherein the second RNTI is used to indicate that the downlink control channel carries information that indicates the first downlink subframe, a second downlink control information (DCI) format used by the downlink control channel comprises a CRS indicator field, the CRS indicator field is used to indicate the first downlink subframe, and a size of the second DCI format is the same as a size of a DCI format1A or a DCI format 1C.

16. A base station, comprising:
a processor, configured to determine a first downlink subframe in which a cell-specific reference signal (CRS) is transmitted;
a transceiver, configured to:
  send, to user equipment, indication information used to indicate the first downlink subframe determined by the processor,
  perform information transmission according to the first downlink subframe determined by the processor, and
  send higher layer signaling to the user equipment, wherein the higher layer signaling indicates a second downlink subframe used to transmit common search space of a physical downlink control channel (PDCCH), and the second downlink subframe is used to indicate the first downlink subframe.

\* \* \* \* \*